US006530667B1

(12) United States Patent  
Idaszak et al.

(10) Patent No.: US 6,530,667 B1  
(45) Date of Patent: Mar. 11, 2003

(54) OPTICAL PROJECTION SYSTEM INCLUDING PROJECTION DOME

(75) Inventors: Raymond L. Idaszak, Apex, NC (US); Richard W. Zobel, Jr., Raleigh, NC (US); D'nardo Colucci, Minneapolis, MN (US); Suresh Balu, Carrboro, NC (US)

(73) Assignee: Elumens Corporation, Cary, NC (US)

( * ) Notice: Subject to any disclaimer, the term of this patent is extended or adjusted under 35 U.S.C. 154(b) by 0 days.

(21) Appl. No.: 09/500,093

(22) Filed: Feb. 8, 2000

(51) Int. Cl.[7] .................. G03B 21/00; G03B 21/14; G03B 21/56; H04N 13/04; G09G 5/00
(52) U.S. Cl. ............ 353/122; 353/11; 353/69; 353/79; 352/70; 359/451; 348/51; 348/121; 348/905; 345/716; 345/778
(58) Field of Search ............ 353/13, 122, 69, 353/79, 11, 12; 352/69, 70, 71; 359/451; 348/51, 121, 905; 345/716, 778

(56) References Cited

U.S. PATENT DOCUMENTS

| | | | | |
|---|---|---|---|---|
| 4,500,163 A | * | 2/1985 | Burns et al. | 359/15 |
| 4,656,506 A | * | 4/1987 | Ritchey | 348/39 |
| 4,725,106 A | | 2/1988 | Shields et al. | 312/208 |
| 5,011,263 A | * | 4/1991 | Hopper | 359/451 |
| 5,394,198 A | | 2/1995 | Janow | 348/744 |
| 5,500,747 A | * | 3/1996 | Tanide et al. | 359/5 |
| 5,502,481 A | | 3/1996 | Detinger et al. | 348/51 |
| 5,611,174 A | * | 3/1997 | Hayashi | 52/8 |
| 5,746,599 A | * | 5/1998 | Lechner | 434/44 |
| 5,762,413 A | | 6/1998 | Colucci et al. | 353/122 |
| 6,034,717 A | | 3/2000 | Detinger et al. | 348/51 |

FOREIGN PATENT DOCUMENTS

| | | | | |
|---|---|---|---|---|
| EP | 0836169 | | 4/1998 | G09B/9/05 |
| JP | 07080096 A | | 3/1995 | A63B/22/06 |
| WO | WO 9825179 A | | 6/1998 | G03B/21/00 |
| WO | WO 9838599 A | | 9/1998 | G06T/15/00 |

OTHER PUBLICATIONS

International Search Report for PCT/US01/00085, dated Jun. 22, 2002.
Patent Abstracts of Japan, vol. 1995 No. 06, Jul. 31, 1995, JP07080096A, one page.

* cited by examiner

Primary Examiner—Russell Adams
Assistant Examiner—Magda Cruz
(74) Attorney, Agent, or Firm—Myers Bigel Sibley & Sajovec

(57) ABSTRACT

A visual workstation for use by a viewer includes a dome having an open front end and a truncated spherical inner dome surface. A work surface is disposed in front of and adjacent the dome front end. The work surface defines a viewer area on a side of the work surface opposite the dome. The viewer area is sized and configured to receive the viewer and is positioned relative to the spherical inner dome surface such that the viewer, when located in the viewer area, may view the spherical inner dome surface. A projector is disposed between the viewer area and the dome. The projector is operative to project a truncated spherical projection onto the inner dome surface.

54 Claims, 19 Drawing Sheets

OPTICAL PROJECTION SYSTEM INCLUDING PROJECTION DOME

FIELD OF THE INVENTION

The present invention relates to visual projection systems and, more particularly, to visual projection systems including projection domes.

BACKGROUND OF THE INVENTION

Hemispherical optical projection systems are used to project images onto the inner surfaces of domes. Hemispherical optical projection systems are used in planetariums, commercial and military flight simulators, and in various hemispherical theaters. With the present interest in virtual reality and three-dimensional rendering of images, hemispherical optical projection systems are being investigated for projecting images which simulate a real environment.

Typically, hemispherical optical projection systems include relatively large domes having maximum diameters from about 4 meters to more than 30 meters. Such systems are well-suited for displays to large audiences. However, such systems may be large and cumbersome and often cost several hundreds of thousands of dollars, thus making them prohibitively expensive for many uses.

SUMMARY OF THE INVENTION

Embodiments of visual workstations according to the present invention are adapted for use by a viewer and include a dome having an open front end and a truncated spherical inner dome surface. A work surface is disposed in front of and adjacent the dome front end. The work surface defines a viewer area on a side of the work surface opposite the dome. The viewer area is sized and configured to receive the viewer and is positioned relative to the spherical inner dome surface such that the viewer, when located in the viewer area, may view the spherical inner dome surface. A projector is disposed between the viewer area and the dome. The projector is operative to project a truncated spherical projection onto the inner dome surface.

According to other embodiments of the present invention, a visual presentation system for use by a viewer includes a dome having an open front end and a truncated spherical inner dome surface. A support surface is disposed in front of the dome front end. The system is configured to maintain a prescribed distance between the support surface and the inner dome surface. A projector is supported by the support surface. The projector is operative to project a truncated spherical projection onto the inner dome surface.

According to other embodiments of the present invention, a visual presentation system for use by a viewer includes a dome having an open front end and a truncated spherical inner dome surface. A projector is operative to project a truncated spherical projection onto the inner dome surface. The truncated spherical inner dome surface has a maximum diameter of no more than two meters.

According to other embodiments of the present invention, a visual presentation system for use by a viewer includes a dome having an open front end and a truncated spherical inner dome surface. The system further includes an image source comprising an array of image pixels. A projector is operative to project the array of image pixels onto the inner dome surface as a truncated spherical projection. The number of pixels of the array of image pixels which are projected by the projector onto the inner dome surface is adjustable.

Preferably, the truncated spherical projection has constant angular separation among adjacent pixels. Preferably, the truncated spherical projection includes an axially asymmetric, truncated spherical primary image. Preferably, the array of image pixels defines an array center, the projector includes a lens assembly having an optical axis, and the relative positions of the optical axis and the array center are adjustable.

According to other embodiments of the present invention, a visual presentation system for use by a viewer includes a dome having an open front end and a truncated spherical inner dome surface. An image source displays a source image. The source image includes a primary image and a secondary image adjacent the primary image. A projector is provided which is selectively operable to project the source image onto the inner dome surface as a truncated spherical projection such that both the primary and the secondary image are projected onto the inner dome surface and, alternatively, such that only the primary image is projected onto the inner dome surface.

Preferably, the projector is selectively operable to project the entirety of the source image onto the inner dome surface. Preferably, the source image has a center, the projector includes a lens assembly having an optical axis, and the system includes means for adjusting the relative positions of the optical axis and the center of the source image. Preferably, the primary image is truncated circularly shaped. Additionally, the source image is preferably rectangular.

According to other embodiments of the present invention, a method of displaying an image on a dome having an open front end and a truncated spherical inner dome surface includes providing a source image including a primary image and a secondary image adjacent the primary image. The source image is projected such that only the primary image is projected onto the inner dome surface as a truncated spherical projection. Thereafter, the source image is projected such that both the primary image and the secondary image are projected onto the inner dome surface as a truncated spherical projection.

Preferably, each of the steps of projecting includes projecting the source image using a lens assembly having an optical axis, and the method further includes adjusting the relative positions of the optical axis and a center of the source image. Preferably, the primary image is truncated circularly shaped and the step of projecting the source image such that only the primary image is projected includes spacing the optical axis and the center of the source image apart.

Objects of the present invention will be appreciated by those of ordinary skill in the art from a reading of the Figures and the detailed description of the preferred embodiments which follow, such description being merely illustrative of the present invention.

DETAILED DESCRIPTION OF THE PREFERRED EMBODIMENTS

Figure 1:
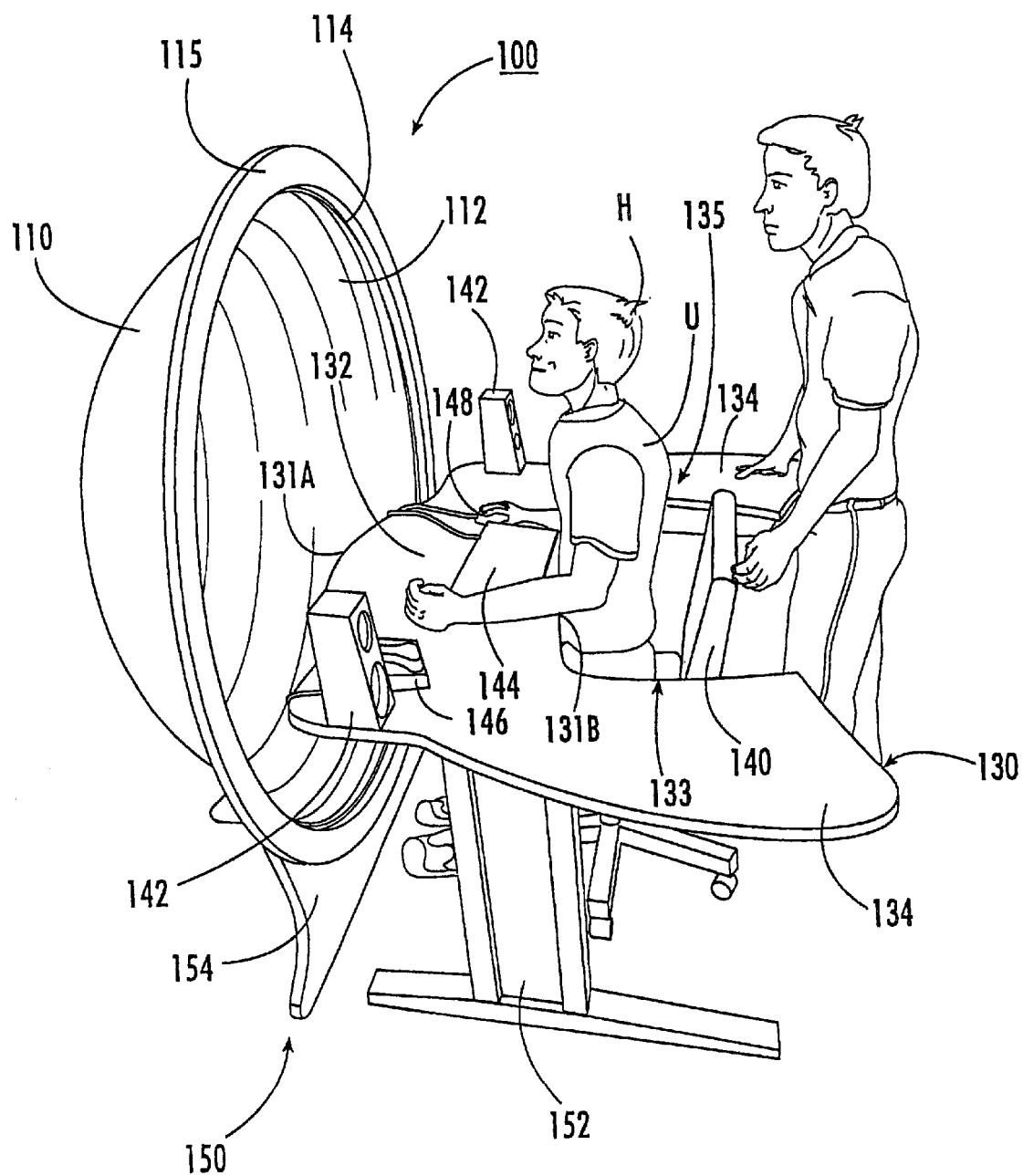
FIG. 1 is a front, perspective view of an optical projection system according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIGS. 1–7, a visual presentation system or workstation 100 according to a first embodiment of the present invention is shown therein. The workstation includes a dome 110, a desktop 130, a supporting framework generally designated 150, a projector 120, an image generator 124 (see FIG. 2) and a seat 140 (preferably a chair as shown). The projector 120 includes a projection lens assembly 122. The workstation is adapted for use by a user or viewer U. The image generator 124 may be a general purpose computer, a video player, a digital camera or any other suitable device. As will be more apparent from the description that follows, the workstation 100 provides the viewer U with a visually immersive experience. Additionally, the workstation 100 provides a convenient and effective work environment and may include individual modularized components which may be further broken down to be portable.

As used herein, the "front" of the dome 110 is the open end of the dome 110. "Left" and "right" are indicated from the perspective of the viewer U.

Figure 2:
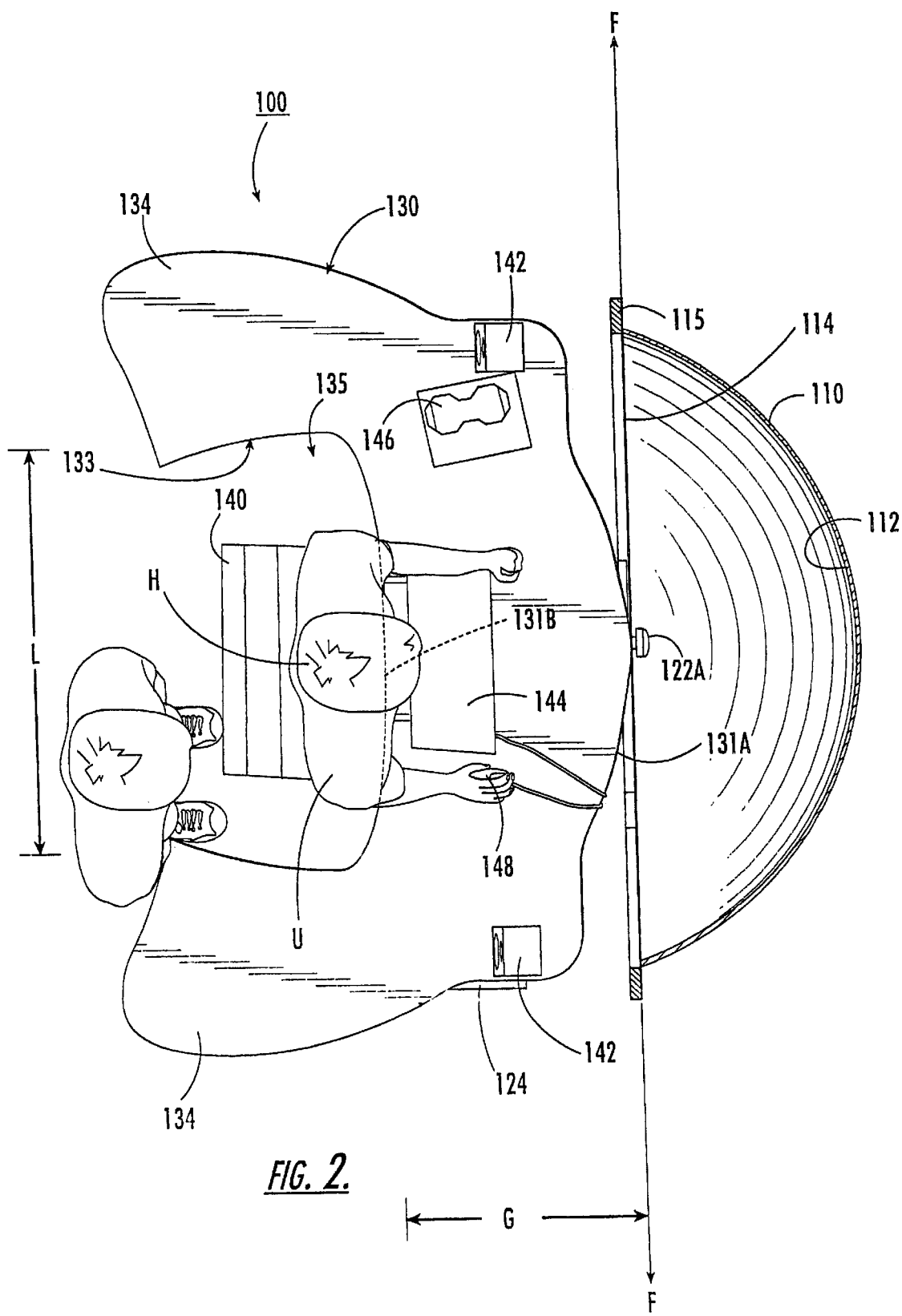
FIG. 2 is a fragmentary, top view of the optical projection system of FIG. 1.

As shown in FIGS. 1 and 2, the workstation 100 can also include various peripheral components to enhance its utility as workstation. A keyboard 144, a pair of speakers 142, a telephone 146 and a mouse 148 are provided. Some or all of these devices may be omitted. For example, the optical projection system 100 may be used as a presentation-only system or as a limited interaction workstation. For clarity, the foregoing devices are not shown in FIGS. 3–7.

The dome 110 is preferably formed of molded LEXAN™, KYDEX™, CELTEC™, SINTRA™, acrylic or other suitable rigid, lightweight material. The dome 110 has an interior truncated spherical projection surface 112. The projection surface 112 terminates at a front peripheral edge 114. As indicated in FIG. 2, the front edge 114 defines a vertical front plane F—F. The front plane F—F is preferably substantially perpendicular to the horizontal center axis X—X of the dome 110 and the projection surface 112. The dome 110 also has a surrounding fascia 115 attached to the front edge 114. The projection surface 112 is adapted to reflect incident light for display of projections to the viewer U. Although the surface 112 may be white, it is preferably tinted or coated with a layer of substantially opaque paint. More preferably, the tint or paint is between about 5% and 20% gray. The dome 110 may be formed of or coated on its outer surface with an opaque material. The screen surface may also be formed of polarization preserving material.

Figure 7:
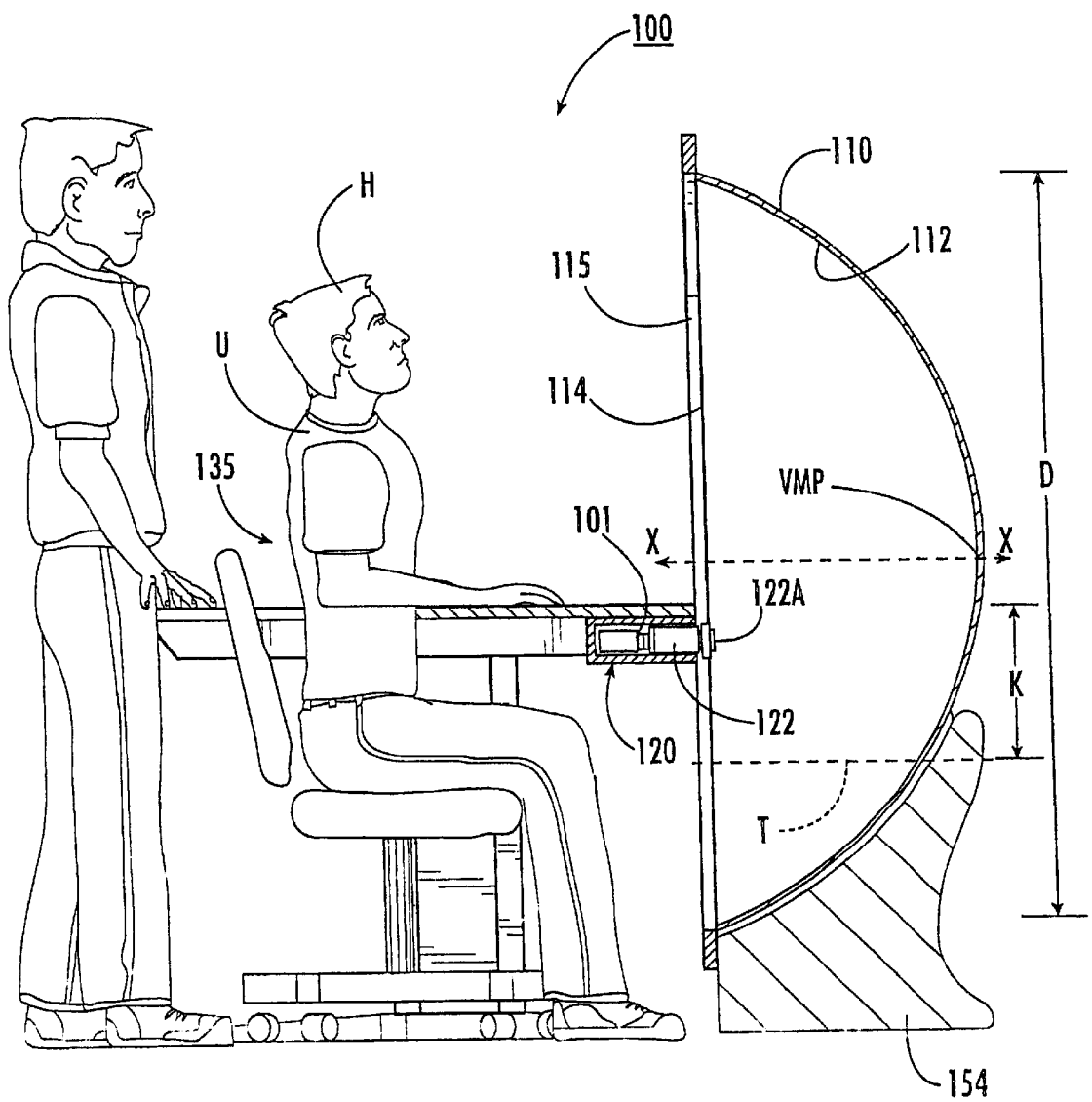
FIG. 7 is a fragmentary, side view of the optical projection system of FIG. 1.

The dome 110 is a truncated sphere, preferably a hemisphere, and is preferably axially symmetric about its horizontal center axis X—X (see FIG. 7) as shown. Preferably, the dome 110 has horizontal and vertical sweeps of between about 140° and 180°, and more preferably of about 150°. With reference to FIG. 7, the interior projection surface 112 of the dome 110 should have a maximum diameter D (i.e., at the front edge 114) of no more than 2 meters. More preferably, the maximum diameter D is between about 0.5 and 2 meters and, most preferably, the maximum diameter D is about 1.5 meters.

The dome 110 is supported in an upright orientation by a T-shaped pedestal 154 forming a part of the supporting framework 150. Other supporting elements may be used in place of or in addition to the pedestal 154. For many applications, the dome 110 is preferably detachably fastened to or interlocked with the pedestal 154 to allow breakdown for shipping and moving of the workstation 100. Optionally (not shown), the dome 110 may be formed of multiple attachable and detachable segments. The pedestal 154 may be formed of wood, fiberboard, plastic or any other suitable material.

The desktop 130 is supported, for example, by legs 152 forming a part of the supporting framework 150. For many applications, the desktop 130 and the legs 152 are preferably detachably connected. The desktop 130 may be formed of wood, plastic, metal or any other suitable material.

Figure 3:
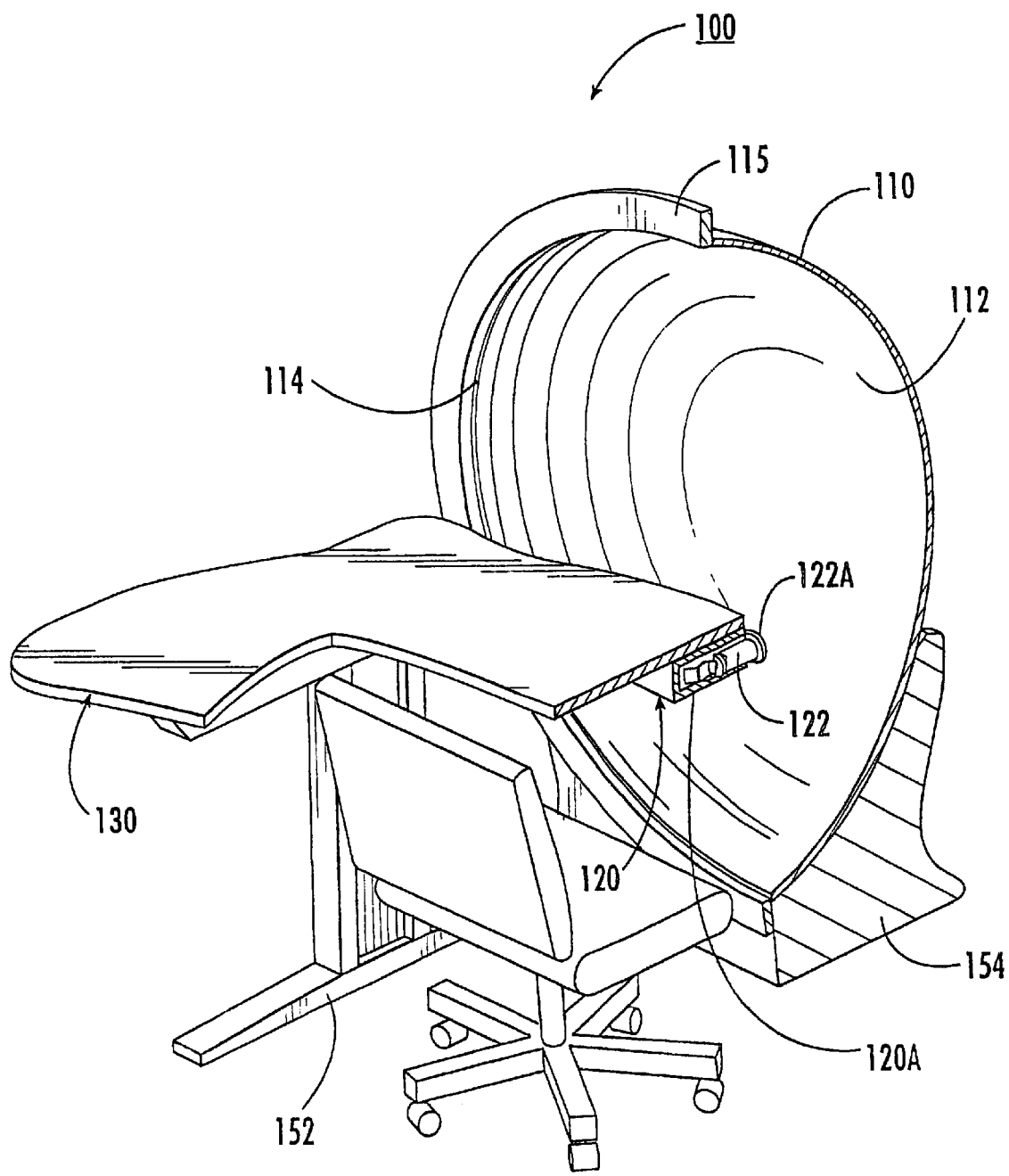
FIG. 3 is a fragmentary, front, perspective view of the optical projection system of FIG. 1.
Figure 4:
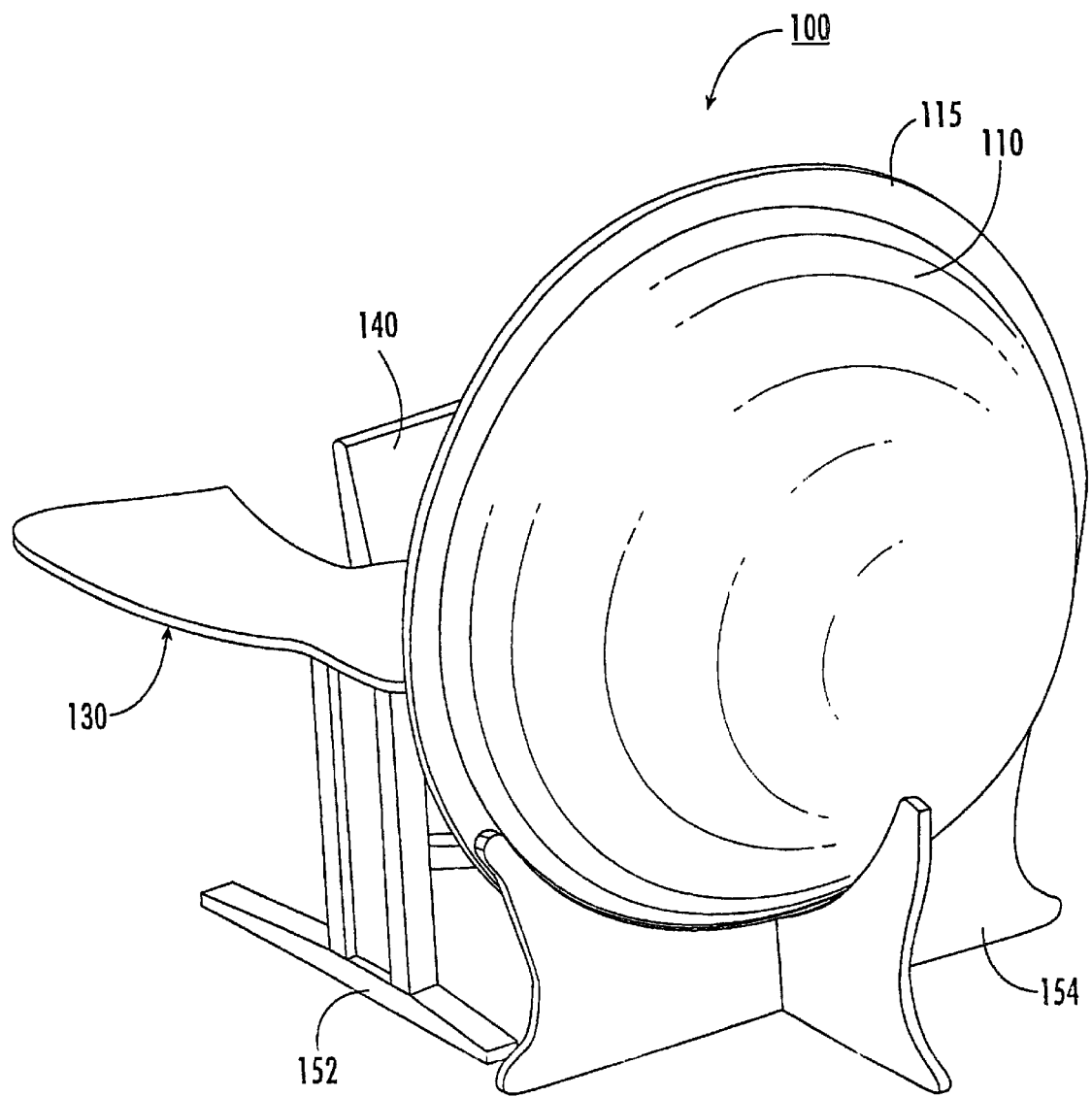
FIG. 4 is a rear, perspective view of the optical projection system of FIG. 1.
Figure 5:
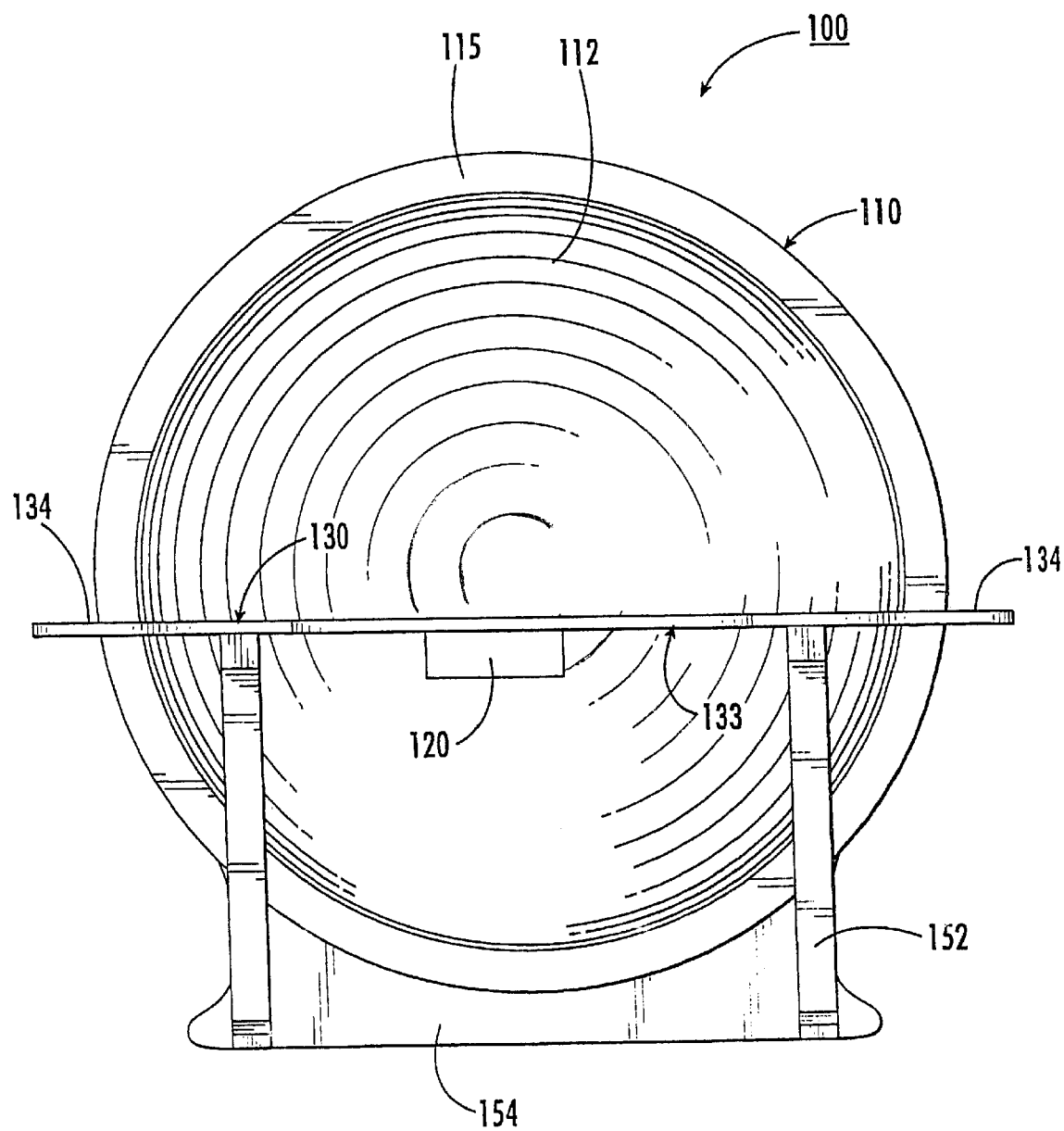
Figure 6:
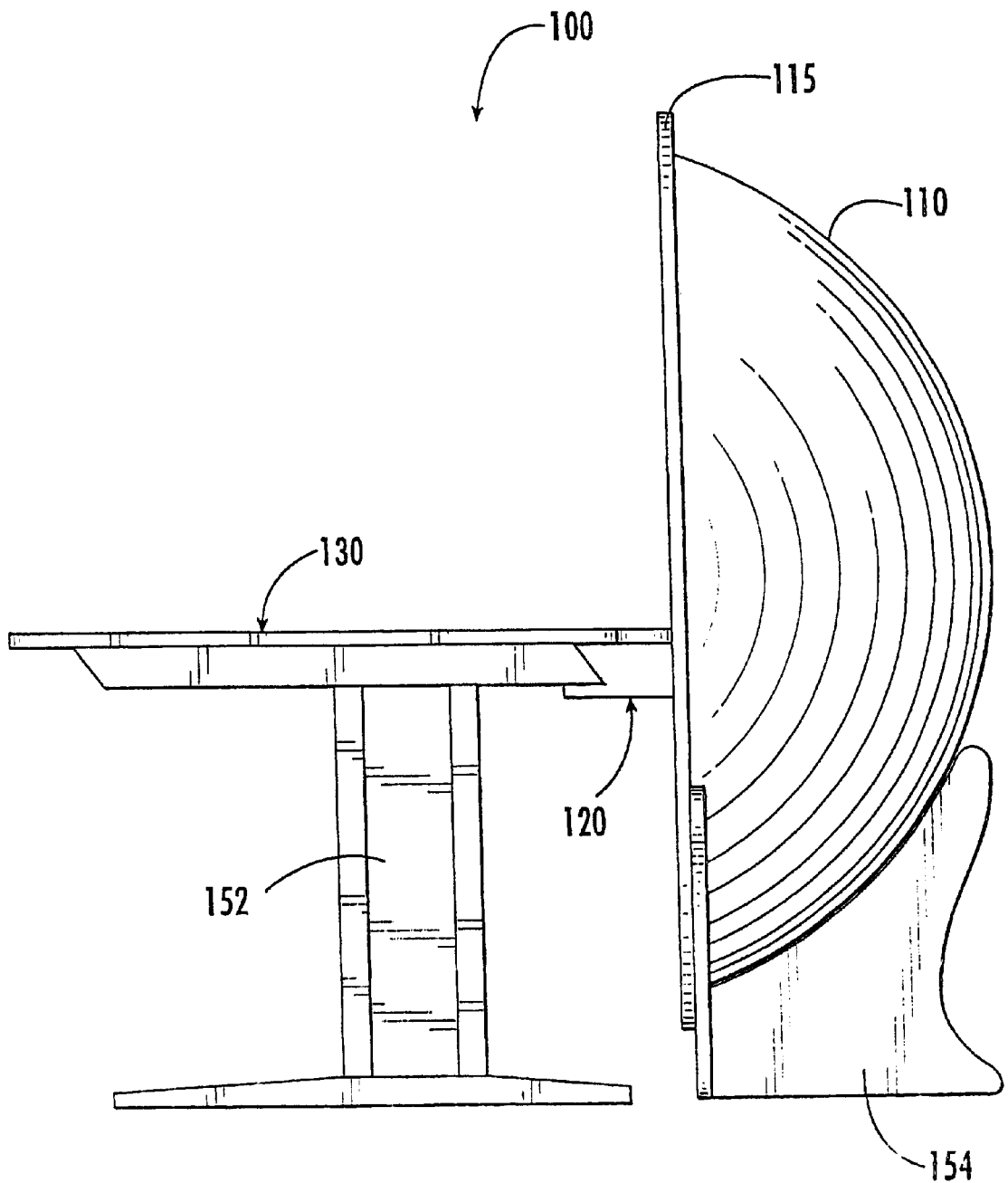
FIG. 6 is a side elevational view of the optical projection system of FIG. 1.

As best seen in FIGS. 1–3, the desktop 130 has a main section 132 which provides a work surface for the viewer U and a support surface for the projector 120. The work surface is preferably horizontally oriented as shown. A front edge 131A of the main section 132 is disposed adjacent the front of the dome 110. Optionally (not shown), the front edge 131A may abut the front face (i.e., the fascia 115) of the dome 110. A cutout 133 in the desktop 130 forms side wings 134 and a rear edge 131B of the main section 132. A viewer area 135 is defined adjacent the rear edge 131B on the side of the desktop 130 opposite the dome 110. As shown, the viewer area 135 is further defined by the side wings 134, which are optional. Preferably, the distance G between the front plane F—F and the rear edge 131B is no more than 25 inches. More preferably the distance G is between about 5 and 15 inches, and most preferably about 10 inches. Preferably, the length L of the rear edge 131B is at least 40 inches. Preferably, the desktop 130 provides a work surface area of at least 1000 square inches.

As will be appreciated from the drawings, the viewer area 135 is configured and sized to receive a viewer U of a size and dimensions within a prescribed range in a seated position and such that a prescribed orientation and relative position between the viewer U and the dome 110, and more particularly, the projection surface 112, are provided, as discussed below. The prescribed viewer range may include, for example, the expected sizes and dimensions for typical adults or the expected sizes and dimensions for typical children in a prescribed age group, depending on the desired application for the workstation 100.

The seat 140 is preferably a chair. As shown, the seat 140 has a supporting pedestal and is not connected to the remainder of the system 100. Alternatively, the seat at 140 may be attached or integrally formed with the dome 110, the desktop 130 and/or the supporting framework 150.

In the embodiment as shown, the workstation 100 is arranged for use by a seated viewer U. Alternatively (not shown), the workstation 100 may be adapted for use by a standing viewer. In such case, the supporting framework 150 may be vertically extended to raise the desktop 130 and the dome 110, and the viewer area 135 may be reconfigured to provide the desired orientation and relative position between the standing viewer U and the dome 110 and the projection surface 112.

With reference to FIGS. 2, 3, and 5–8, the workstation 100 includes an optical projection system 121 including the projector 120, the lens assembly 122 (including a terminal lens 122A) and the computer 124. The projector 120 includes an image plate 101 and suitable electronics 103 (see FIG. 8) for receiving, interpreting and/or converting signals from the computer 124.

The image plate 101 may be any suitable two-dimensional image source the resolution of which is defined by a limiting unit area. The term "pixel" as used herein refers to any such unit area. Preferably, the image plate 101 includes an array of defined image pixels, for example, as may be provided in a liquid crystal display. However, non-segmented image sources or other segmented image sources (for example, having scan lines) may be used as well, in which case the resolutions thereof may be defined by other unit areas.

Preferably, and as shown, the projector 120 is secured to the underside of the desktop main section 132. Alternatively (not shown), the projector 120 may fixedly or loosely mounted on top of the desktop 130. Alternatively (not shown), the projector may be mounted on its own stand independent of the desk. The computer 124 is preferably located beneath the desktop 130 and is connected to the projector 120 by a suitable connector (not shown).

With reference to FIGS. 2, 3 and 7, most of the lens assembly 122 is disposed within a casing 120A with the terminal lens 122A extending forwardmost and beyond the casing 120A. Most or all of the remaining components of the projector 120 are disposed in the casing 120A and leftward of the lens assembly 122. This arrangement provides a relatively compact projector, particularly along the length between the viewer and the dome.

The projector 120, the lens assembly 122 (including the lens 122A) and the computer are preferably as described in U.S. Pat. No. 5,762,413 to Colucci et al., filed Jan. 29, 1996, entitled "Tiltable Hemispherical Optical Projection Systems and Methods Having Constant Angular Separation of Projected Pixels", which is assigned to the assignee of the present application, the disclosure of which is incorporated herein by reference in its entirety. Suitable projectors include the Epson PowerLite 710c available from Epson Corp. of Long Beach, Calif., and the LP330 DragonFly available from InFocus Systems Inc. of Wilsonville, Oreg. The optical projection system of the present invention may also employ the dual polarization optical projection systems and methods described in copending application Ser. No. 08/618,442 to Colucci et al., filed Mar. 19, 1996, entitled "Dual Polarization Optical Projection Systems and Methods", which is assigned to the assignee of the present application, the disclosure of which is incorporated herein by reference in its entirety. The optical projection system of the present invention may employ the systems, methods and computer program products described in copending application Ser. No. 08/806,788 to Idaszak et al., filed Feb. 26, 1997, entitled "Systems, Methods and Computer Program Products for Converting Image Data to Nonplanar Image Data", which is assigned to the assignee of the present application, the disclosure of which is incorporated herein by reference in its entirety. Suitable modifications to the optical projection systems described herein will be apparent to those of ordinary skill in the art upon reading the description herein and the cited disclosures.

Figure 8:
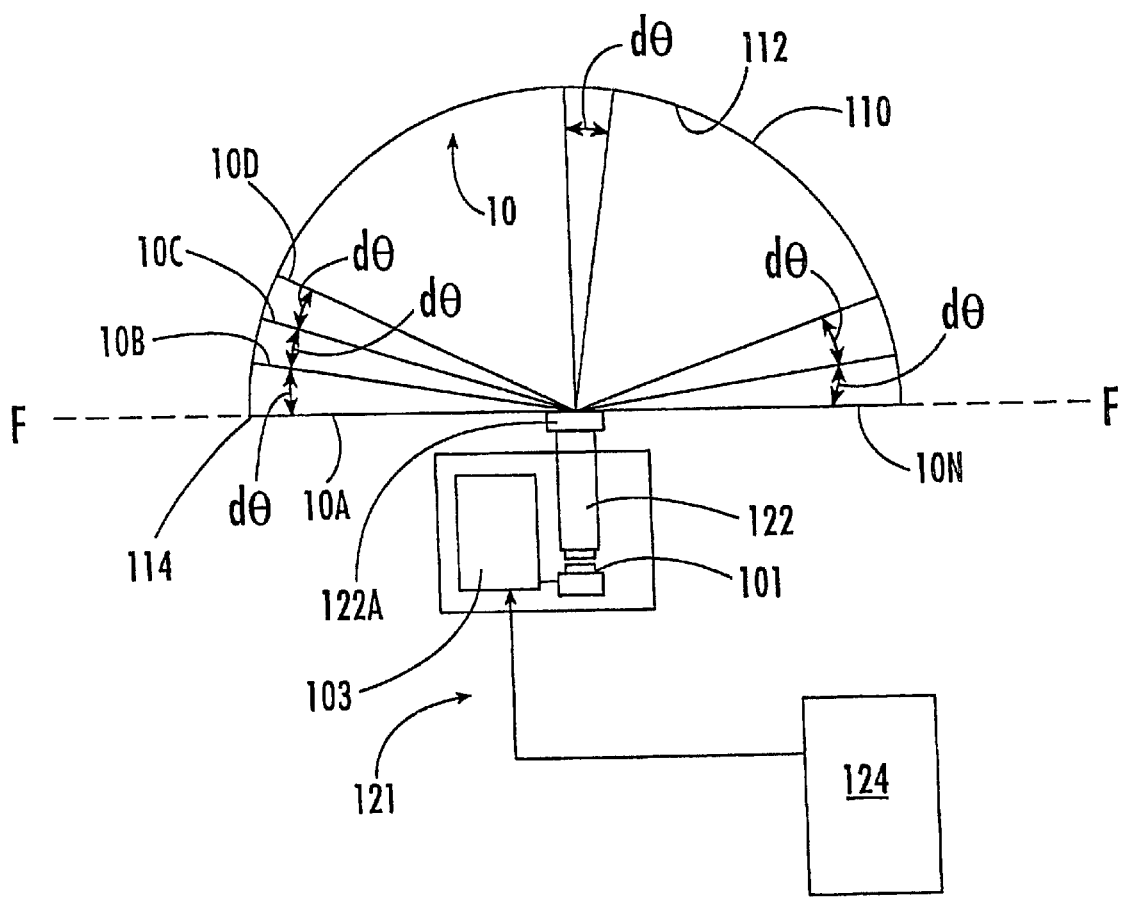
FIG. 8 is a schematic block diagram representing the optical projection system of FIG. 1.

With reference to FIG. 8, the optical projection system 121 projects a truncated spherical projection 10 onto the interior projection surface 112 of the truncated spherical dome 110. The projection 10 has constant angular separation among adjacent pixels as indicated by angle $d\theta$ which is constant among adjacent pixels 10A–10N. The constant angular separation truncated spherical optical projection system 121 is an inverse telephoto system having an $f \cdot \theta$ focal distribution. The image height is proportional to $f \cdot \theta$, where f is the focal length of the lens and $\theta$ is the projected angle at the image location. The preferred construction and attributes of the optical projection system 121 will be further appreciated from the disclosure of U.S. Pat. No. 5,762,413 to Colucci et al.

Preferably and as shown, the front surface of the terminal lens 122A is substantially coincident with the front plane F—F of the projection surface 112. Alternatively, the terminal lens 122A may be disposed forwardly of the plane F—F and within the interior volume defined by the projection surface 112 of the dome 110. The projection 10 preferably extends across a full field of view of about 180°. However, if the terminal lens 122A is positioned within the interior volume of the projection surface 112, a field of view greater than 180° should be used.

Notably, the projector 120 and the lens assembly 122 are positioned between the viewer U and the projection surface 112. The terminal lens 122A is located beneath the vertical midpoint VMP (see FIG. 7) of the dome 110. The viewer U is preferably positioned such that his/her head H is located above the vertical midpoint VMP of the dome 110 when the viewer U is seated in the viewer area 135.

The desktop 130 and the viewer area 135 tend to position the viewer U such that the viewer's head H stays between about zero and 15 inches from the projection surface front edge 114, and more preferably about 10 inches. This positioning, along with the preferred dimensions, configurations and relative arrangements of the aforedescribed components, provide the viewer U with a realistic three-dimensional visual environment with minimal distortion or inconsistency in the image as a function of the viewer's position within the viewer area 135. The workstation 100 provides a particularly immersive visual environment in that, when the viewer U is looking directly forward into the dome 110, the projected image extends substantially fully across the viewer's range of peripheral vision in all directions.

Alternatively (not shown), the front plane of the projection surface may be defined by the front edge of the dome 110. For example, the fascia 115 may be omitted or the projection 10 may extend to the inwardly facing surface of the fascia 115.

Optionally, the workstation 100 may be adapted to display stereographic images. The viewer U may wear shuttered glasses which alternately open and close the left and right eye views in synchrony with projections of corresponding left and right images. Using polarization preserving screen material, stereo images may be projected. A suitable method is described in application Ser. No. 08/618,442 to Colucci et al., filed Mar. 19, 1996, entitled "Dual Polarization Optical Projection Systems and Methods".

Figure 9:
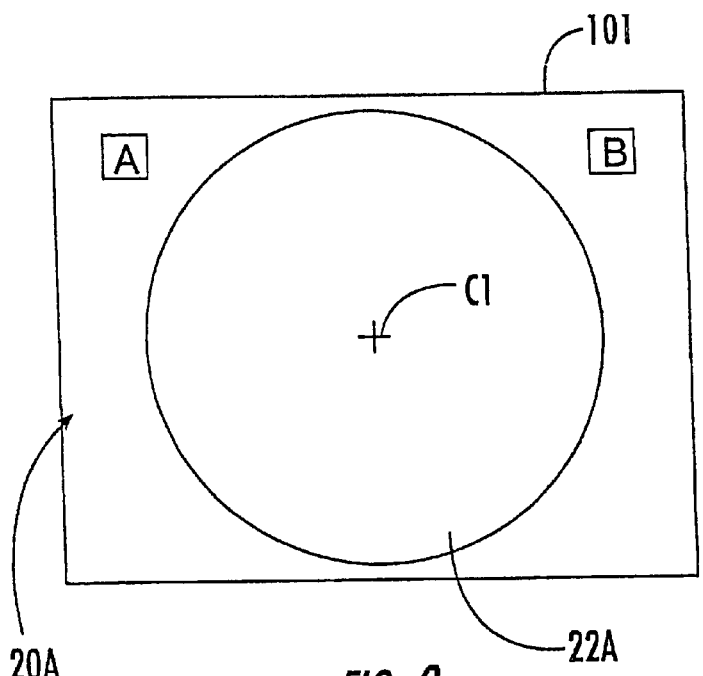
FIG. 9 is a schematic representation of a two-dimensional image plate forming a part of the optical projection system of FIG. 1 and displaying a first image.
Figure 10:
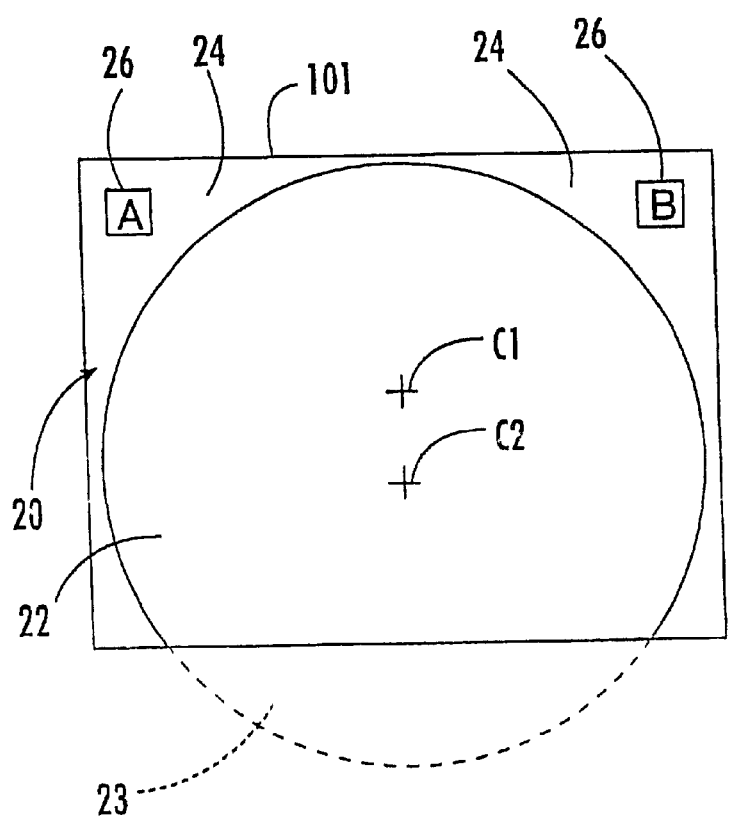
FIG. 10 is a schematic representation of the two-dimensional image plate of FIG. 9 displaying a second, alternative image.

With reference to FIGS. 9 and 10, the image which is projected onto the dome 110 is preferably modified to provided enhanced image resolution. The following discussion describes embodiments of mapping and projecting an image and, thereafter a preferred, alternative embodiments of mapping and projecting the image to achieve greater resolution using the same equipment and area of projection surface.

FIG. 9 shows a display of an image 20A on the two-dimensional image plate 101. The display on the image plate 101 corresponds to the manner in which the image 20A would be displayed on a planar display device such as a conventional CRT or other two-dimensional screen. The image plate 101 may be, for example, an active matrix liquid crystal display such as an Epson 0.9 inch Poly-silicon, TFT. It will be appreciated, however, that the image plate 101 may be any suitable two-dimensional image display device.

According to the first embodiments, the image 20A includes a circular primary image 22A which is mapped fully within the bounds of the image plate 101. The lens assembly 122 is configured and arranged relative to the image plate 101 such that the entire circular primary image 22A is projected onto the truncated spherical dome interior projection surface 112. The center C1 of the image 20A is coincident with the center of the dome 110. The primary image 22A is mapped onto a prescribed number of pixels of the image plate 101, which is limited by the graphics software and hardware employed. The primary image 22A is magnified by the lens assembly 122 by the amount necessary to make the periphery of the primary image 22A as projected substantially coextensive with the front edge 114 of the projection surface 112.

According to the preferred, alternative embodiments, the resolution of the projected primary image 22A is increased by both enlarging and truncating the image as shown in FIG. 10. The preferred, alternative image 20 as displayed on the two-dimensional image plate 101 includes a truncated primary image 22 which is enlarged as compared to the primary image 22A. The primary image 22 has the shape of a truncated circle. A lower truncated portion 23 corresponding to a lower part of the primary image 22A is outside the range of the image plate 101 and therefore is not mapped onto the pixels thereof by the graphics software and hardware.

Figure 11:
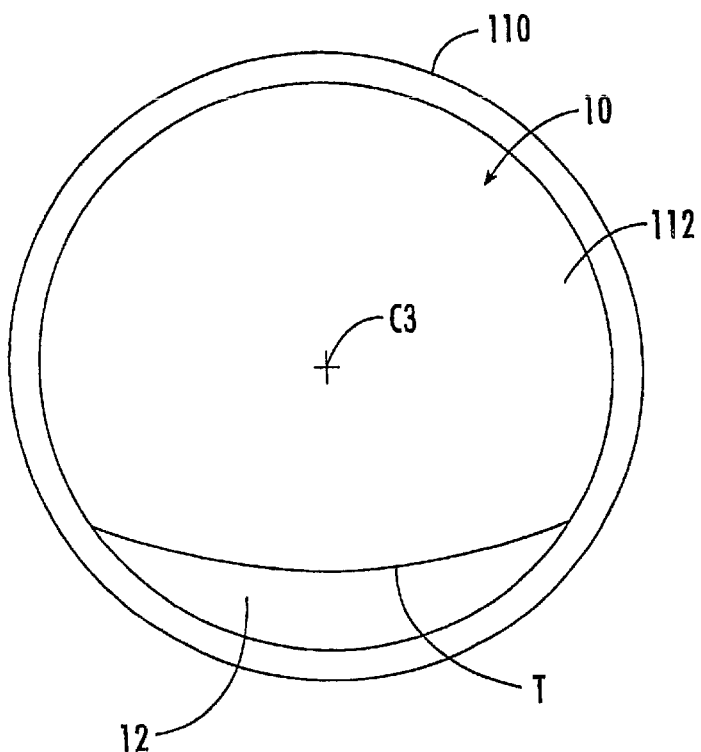
FIG. 11 is a front view of the dome of the optical projection system of FIG. 1 with a first optical projection displayed thereon.

When the primary image 22 is projected by the projection system 121 (FIG. 8) as the projection 10 onto the three-dimensional projection surface 112, the primary image 22 appears as shown in FIG. 11. This is accomplished by configuring and manipulating the lens assembly 122 as follows. In a conventional projection system, the optical axis of the projecting lens is maintained coincident with the center C1 of the image plate 101 (which is also the center of the image 20). By contrast, according to the present invention, the lens assembly 122 is moved vertically relative to the image plate 101 or the image plate 101 is moved vertically relative to the lens assembly 122 such that the optical axis of the lens assembly 122 coincides with the center C2 of the primary image 22. As a result, the center C2 of the primary image 22 as projected onto the projection surface 112 is coincident with the center C3 (see FIG. 11) of the dome 110.

The primary image 22 is magnified by the lens assembly 122 by the amount necessary to make the periphery of the primary image 22 as projected substantially coextensive with the front edge 114 of the projection surface 112. Preferably, the lens assembly 122 is constructed and configured such that a portion, and preferably substantially all, of the image 20 outside of the primary image 22 is clipped by the lens assembly 122 (i.e., is not projected). The projection 10 includes a lower, non-imaged, truncated region 12 (defined between the lower edge T of the image 22 and the lower periphery of the projection surface 112) which corresponds to the truncated portion 23 of the primary image 22. The region 12 is preferably black. The lower edge T corresponds to the lower edge of the image 20 as mapped and displayed on the image plate 101. Accordingly, the primary image 22 is projected onto the projection surface 112 as a truncated spherical projection which is axially asymmetric (the horizontal center axis of the dome 110 being the reference axis).

By enlarging the size of the primary image 22 as compared to the primary image 22A on the image plate 101, less magnification of the image 22 is required to project it over the desired projection area. As a result, greater resolution is achieved (i. e., the ratio of pixels (or other unit area of the image plate 101) per unit area of projection is higher).

Preferably, the primary image 22 is sized and the desktop 130 is positioned such that the lower edge T of the image 22 in the projection 10 is located a distance K (see FIG. 7) below the upper surface of the desktop 130 of between about 12 and 20 inches. In this manner, any recognition by the viewer U that the image has been truncated is substantially reduced or eliminated.

With reference to FIG. 10, many computer program interface displays are designed for use on conventional, two-dimensional, rectangular displays such as the display 101. For example, the Microsoft™ Windows™ operating system may locate secondary images 26 such as various icons, menus, other desktop controls and window control buttons in the displayed image region 24 outside of the primary image 22. Because, the projection 10 includes only the primary image 22, these secondary images 26 and the image region 24 cannot be viewed in the dome 110. In order to allow the viewer to view these outlying portions of the image 20, the workstation 100 may be provided with a second, two-dimensional display monitor adapted to display the full image 20.

Alternatively, and preferably, the workstation 100 solves the foregoing problem by providing means for adjusting the projection 10 to selectively project some or all of the image region 24 onto the projection surface 112 so that a secondary display is not needed. More particularly, the lens assembly 122 may be readjusted to zoom in (i.e., provide less magnification of the image plate 101), thereby reducing the area of the projection surface 112 dedicated to the primary image 22. As a result, some or all of the image region 24 may be projected onto the projection surface 112. Restated, the lens assembly 122 projects a greater number of the pixels of the array of pixels of the image plate onto the projection surface 112. The viewer may thereafter zoom out to return to the projection 10 wherein the primary image 22 fills the projection surface 112. The lens assembly 122 may be zoomed in and out by hand or by using a lever (not shown) or a suitably connected servo-motor (not shown), for example.

Figure 12:
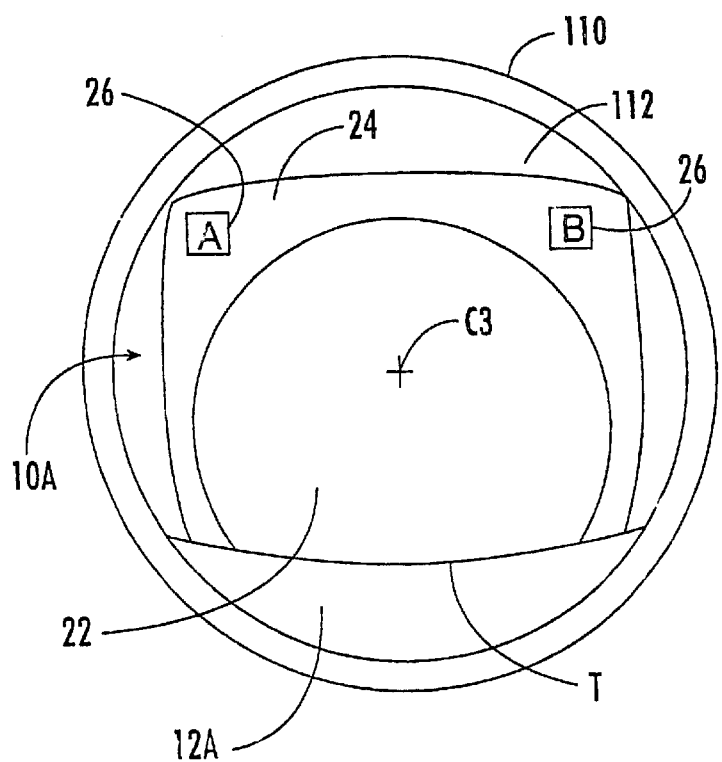
FIG. 12 is a front view of the dome of the optical projection system of FIG. 1 with a second, alternative optical projection displayed thereon.

In order to reduce the degree of zoom in required to display a given amount of the image region 24 on the projection surface 112, the lens assembly 122 is preferably further adjusted as follows. To convert from the projection 10 (FIG. 11) to the projection 10A (FIG. 12), the lens assembly 122 is zoomed in as just discussed. Additionally, the lens assembly 122 is moved vertically relative to the image plate 101 or the image plate is moved vertically relative to the lens assembly 122 such that the optical axis of the lens assembly 122 is coincident with the center C1 of the image plate (and, hence, the image 20). The center of the image 20 is thereby projected onto the center C3 of the dome 110. As a result, the diagonal maximum length of the image 24 extends across the full diameter of the projection surface 112.

The projection 10A includes the primary image 22, a portion or all of the image region 24 (including the secondary images 26) and an enlarged truncated region 12A. The viewer may view and manipulate the secondary images 26 and then return to the original projection 10 for better viewability. It will be appreciated that, if desired, the lens assembly 122 may be zoomed in an amount less than necessary to view the entire image 20. It will also be appreciated that the optical axis of the lens assembly may be relocated vertically relative to the image plate 101 less than the amount necessary to register the image center C1 with the dome center C3.

Figure 13:
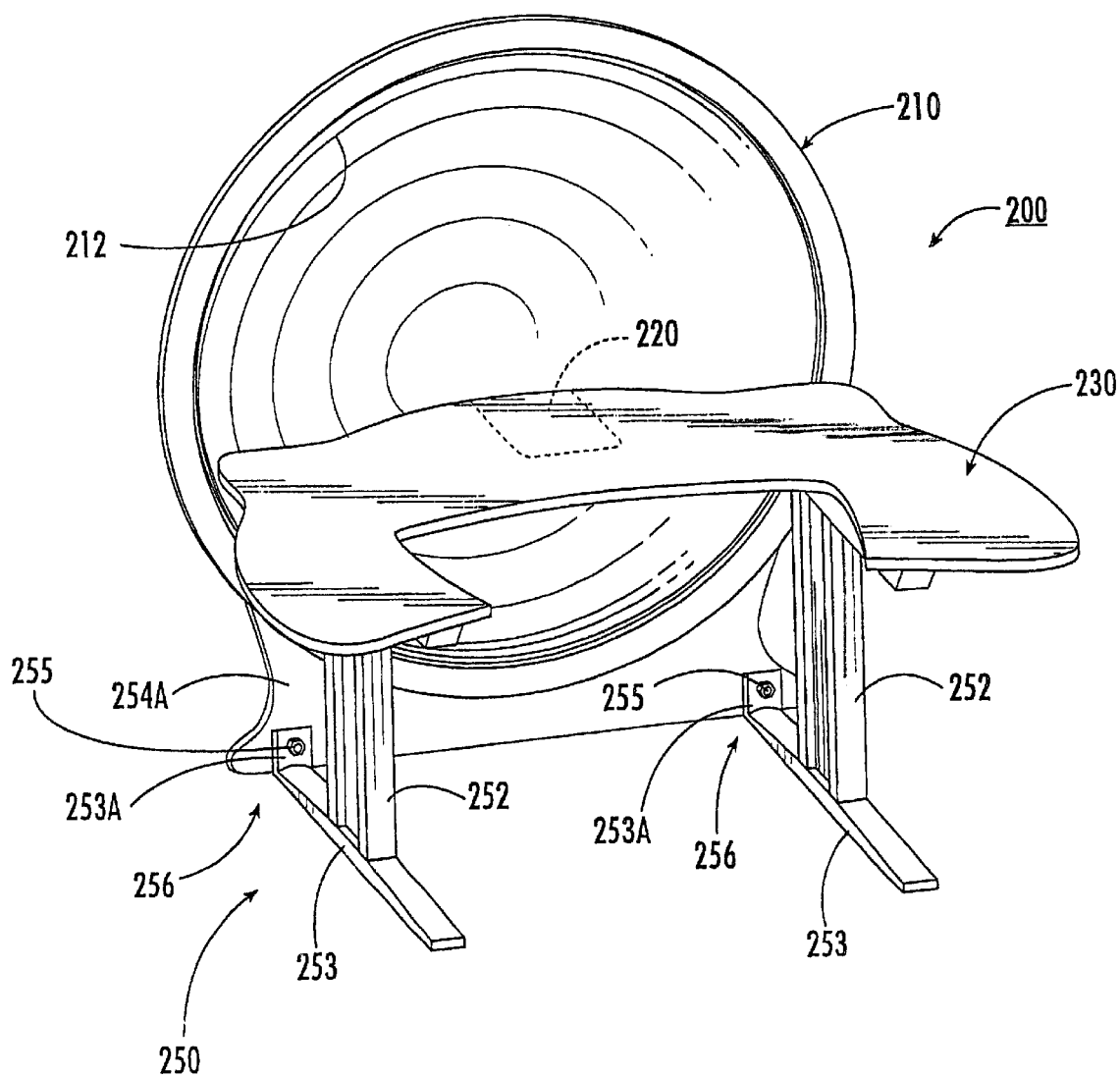
FIG. 13 is a front, perspective view of an optical projection system according to an alternative embodiment of the present invention.

With reference to FIG. 13, a workstation 200 according to a further embodiment of the present invention is shown therein. The workstation 200 corresponds to the workstation 100 except as follows. The workstation 200 differs from the workstation 100 in that the desktop 230 is attached to the dome 210 by means of the supporting framework 250. More particularly, the feet 253 on the legs 252 are secured to the front dome pedestal plate 254A by tabs 253A and bolts 255 to form connections 256. The feet 253 have a prescribed length. In this way, the distance between the desktop 230 and the projection surface 212 is fixed at a prescribed distance. The distance between the viewer (not shown) and the projection surface 212 and the distance between the projector 220 and the projection surface 212 are thereby fixed. The workstation 200 may be modified, supplemented and used in any of the ways set forth above with regard to the workstation 100.

Figure 14:
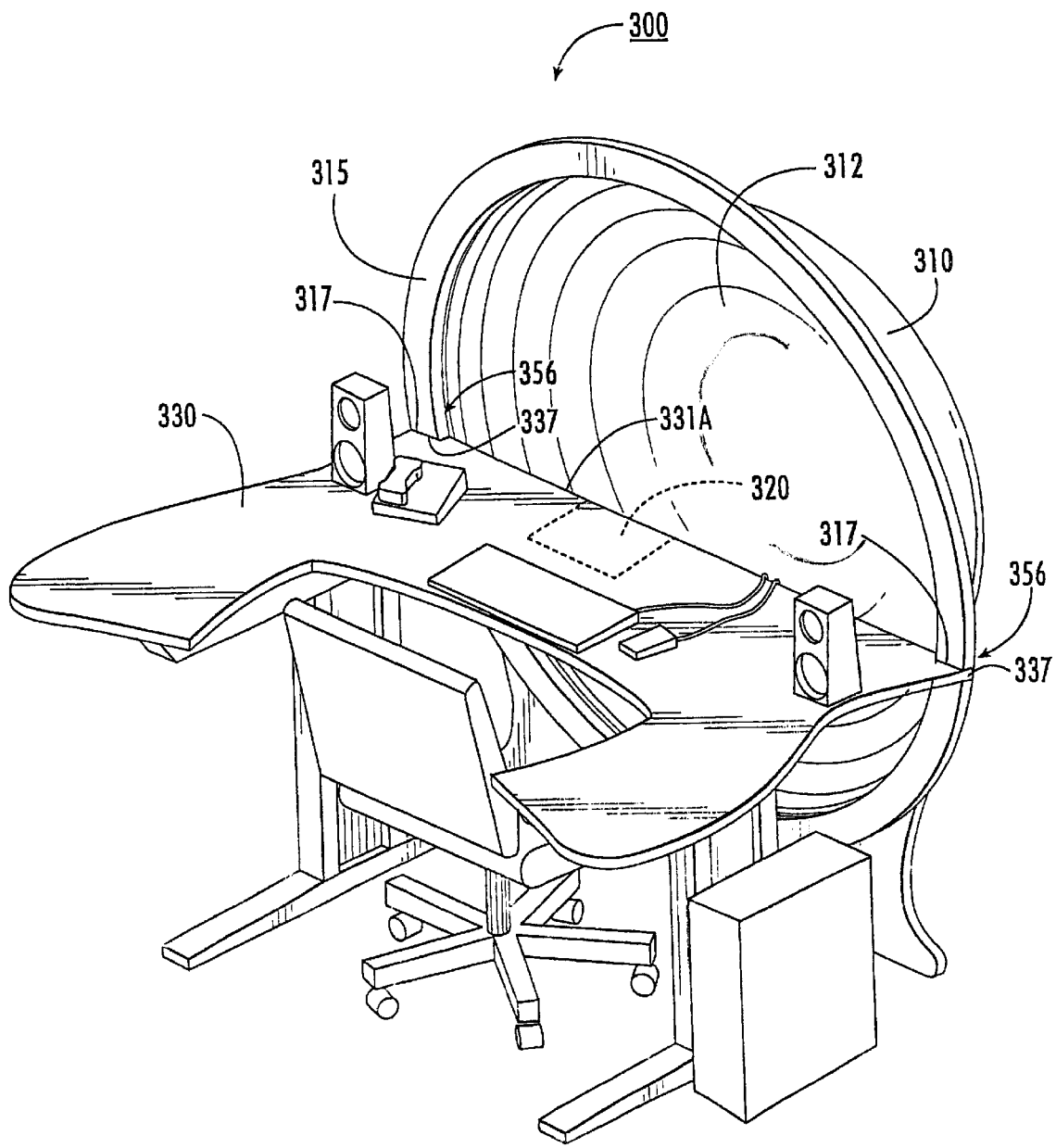
FIG. 14 is a front, perspective view of an optical projection system according to a further alternative embodiment of the present invention.
Figure 15:
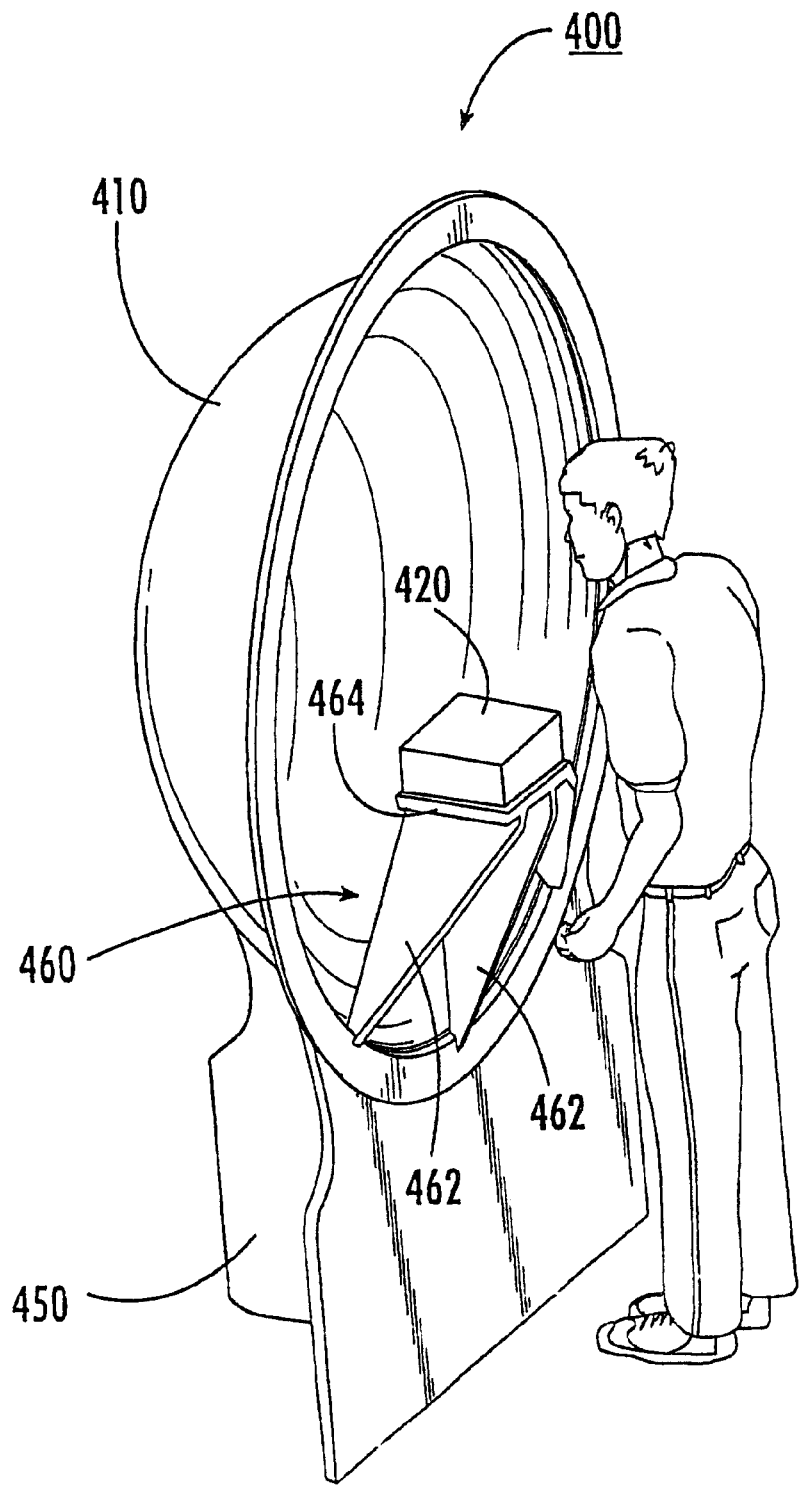
FIG. 15 is a left, front, perspective view of an optical projection system according to a further alternative embodiment the present invention.
Figure 16:
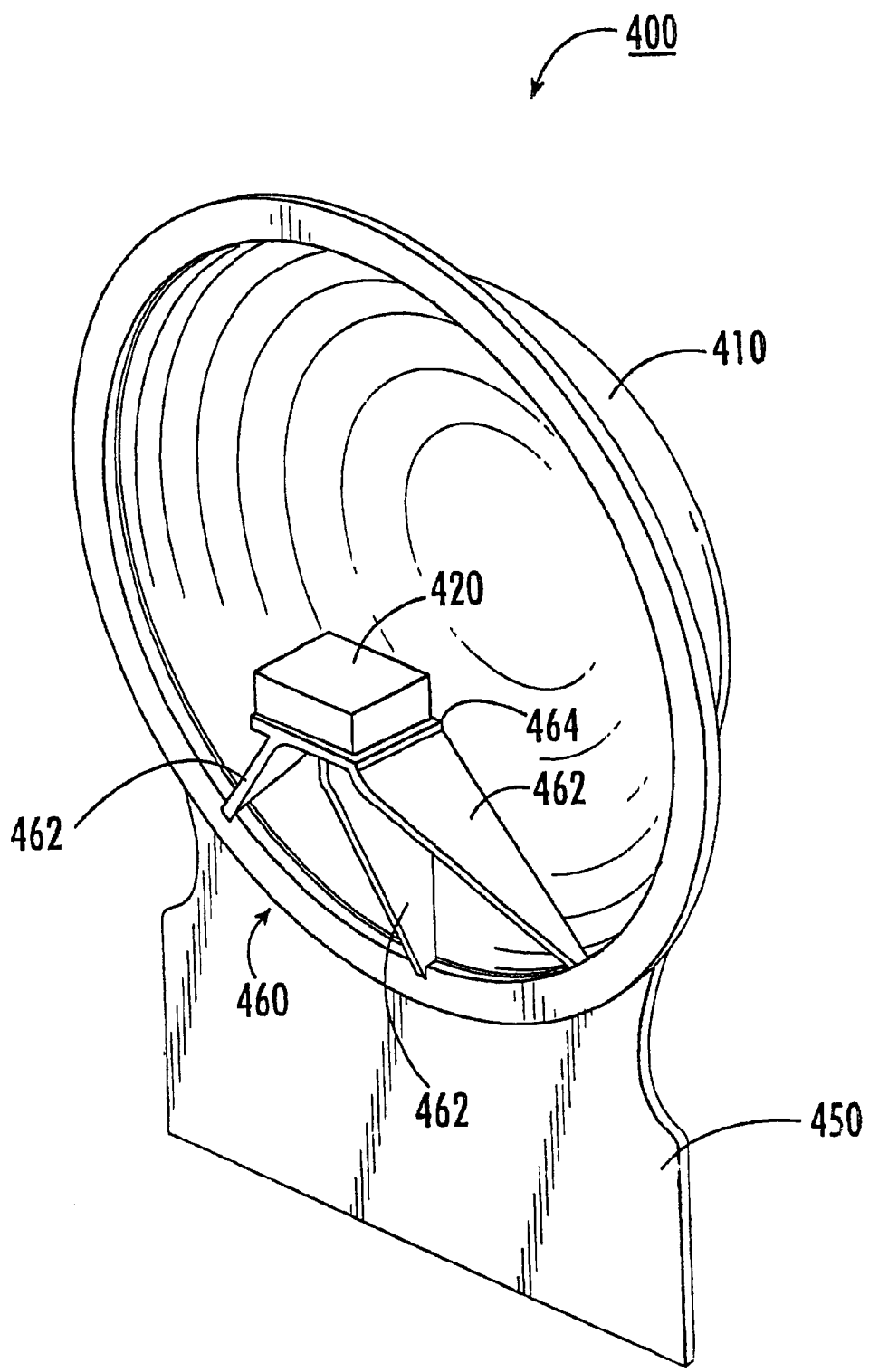
FIG. 16 is a right, front, perspective view of the optical projection system of FIG. 15.
Figure 17:
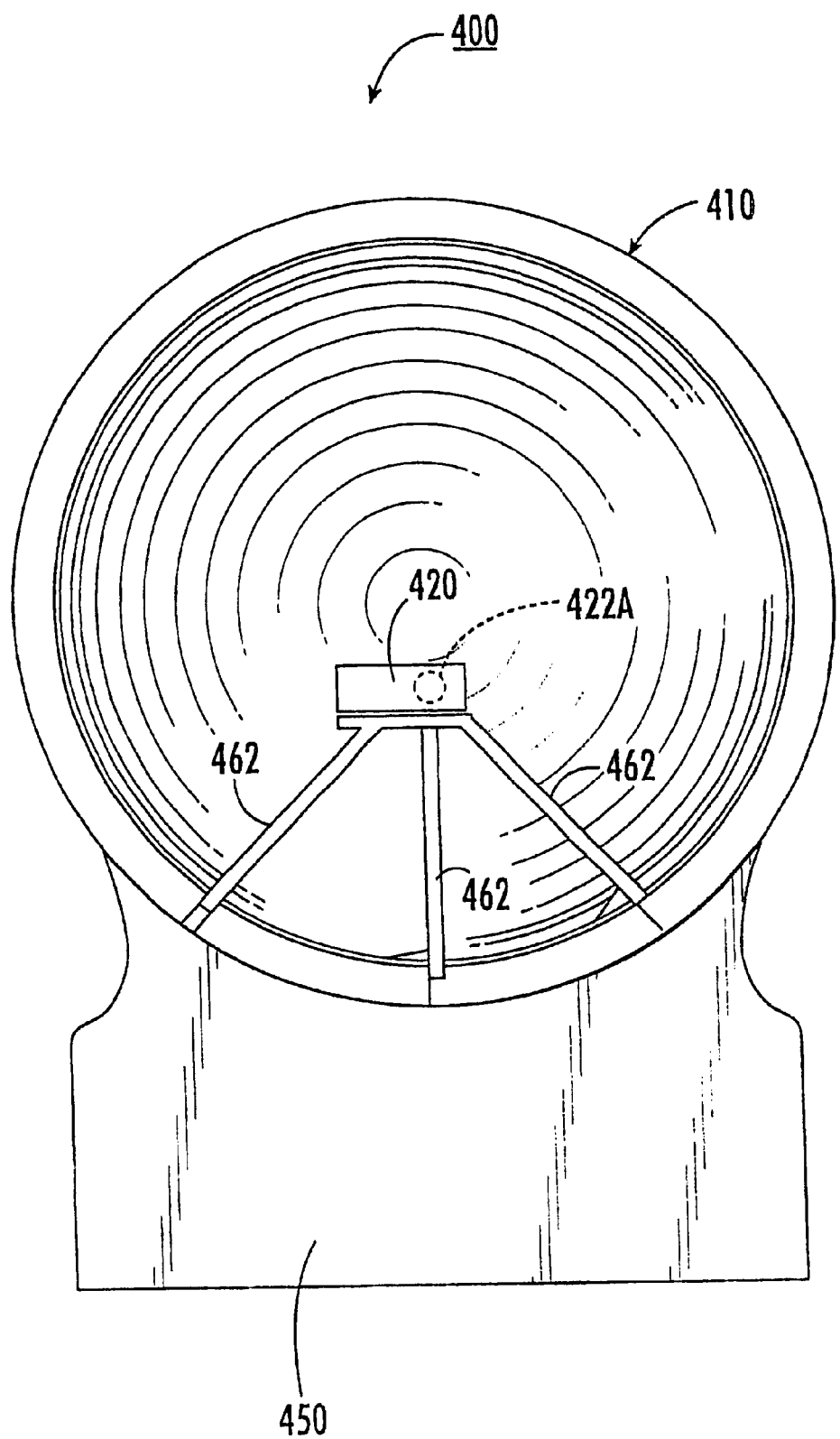
FIG. 17 is a front elevational view of the optical projection system of FIG. 15.
Figure 18:
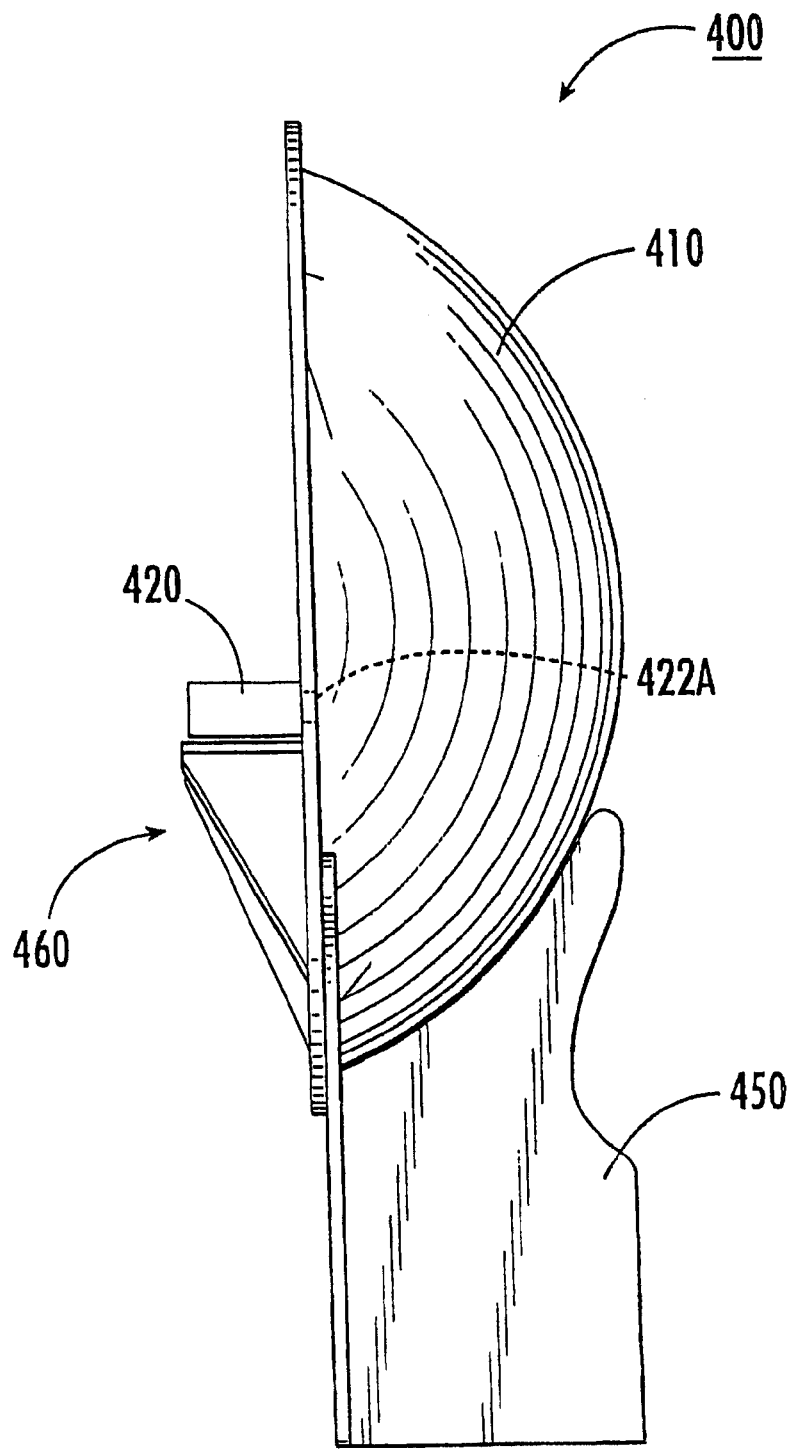
FIG. 18 is a side elevational view of the optical projection system of FIG. 15.

With reference to FIG. 14, a workstation 300 according to a further embodiment of the present invention is shown therein. The workstation 300 corresponds to the workstation 100 except as follows. The workstation 300 differs from the workstation 100 in that the desktop 330 is directly attached to and supports the dome 310. Slots 317 are formed in the fascia 315 of the dome 310. Portions 337 of the desktop 330 are inserted into the slots 317 such that the front edge 331A of the desktop 330 is disposed in the slots to form connections 356. The portions 337 may be retained in the slots 317 by adhesive, press fitting or other suitable means. The dome 310 is suspended from the desktop 330 at the connections 356. The distance between the desktop 330 and the projection surface 312 is fixed. The distance between the viewer (not shown) and the projection surface 312 and the distance between the projector 320 and the projection surface 312 are thereby fixed as well. The workstation 300 may be modified, supplemented and used in any of the ways set forth above with regard to the workstation 100.

With reference to FIGS. 15–18, an optical presentation system 400 according to a further embodiment is shown therein. The system 400 is adapted for displaying images to a standing viewer and does not provide a work surface. The system 400 includes a dome 410, a projector 420, a terminal lens 422A (FIGS. 17 and 18) and a computer or other image generating means (not shown) corresponding to the dome 110, the projector 120, the lens 122A and the computer 124, respectively. An extended pedestal 450 supports the dome 410. Preferably, the center of the dome is positioned at a height of between about 48 and 72 inches from the ground. A support 460 positions the projector 420 and the lens 122A relative to the dome 410 in the same manner and configuration as in the workstation 100. The support 460 includes a plurality of support arms 462 affixed to the dome 410 and a platform 464. The optical presentation system 400 may be modified, supplemented and used in any of the ways set forth above with regard to the workstation 100.

Figure 19:
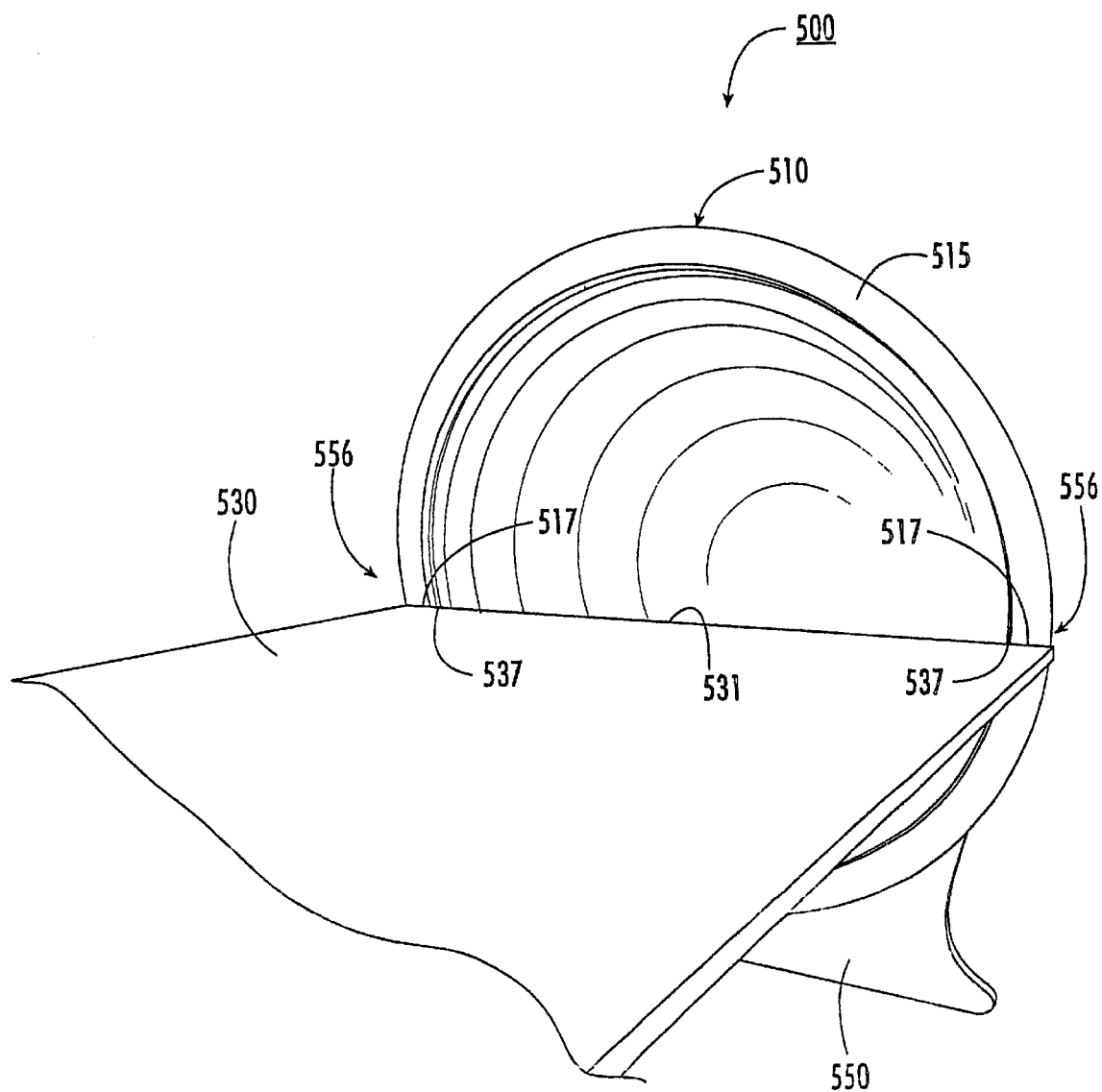
FIG. 19 is a front, perspective view of an optical projection system according to a further alternative embodiment of the present invention.

With reference to FIG. 19, an optical presentation system 500 according to a further embodiment is shown therein. The system 500 corresponds to the system 400 except as follows. The system 500 is adapted for displaying images to a group of seated viewers and provides a tabletop or work surface 530. The tabletop 530 is attached to the dome 510. Slots 517 are formed in the fascia 515 of the dome 510. Portions 537 of the tabletop 530 are inserted into the slots 517 such that the front edge 531 of the tabletop 530 is disposed in the slots to form connections 556. The portions 537 may be retained in the slots 517 by adhesive, press fitting or other suitable means. The dome 510 is supported by a pedestal 550 that is reduced in height as compared to the pedestal 450. Alternatively (not shown), the system 500 may be free and unattached to the tabletop 530. The system 500 may be modified, supplemented and used in any of the ways set forth above with regard to the workstation 100.

Figure 20:
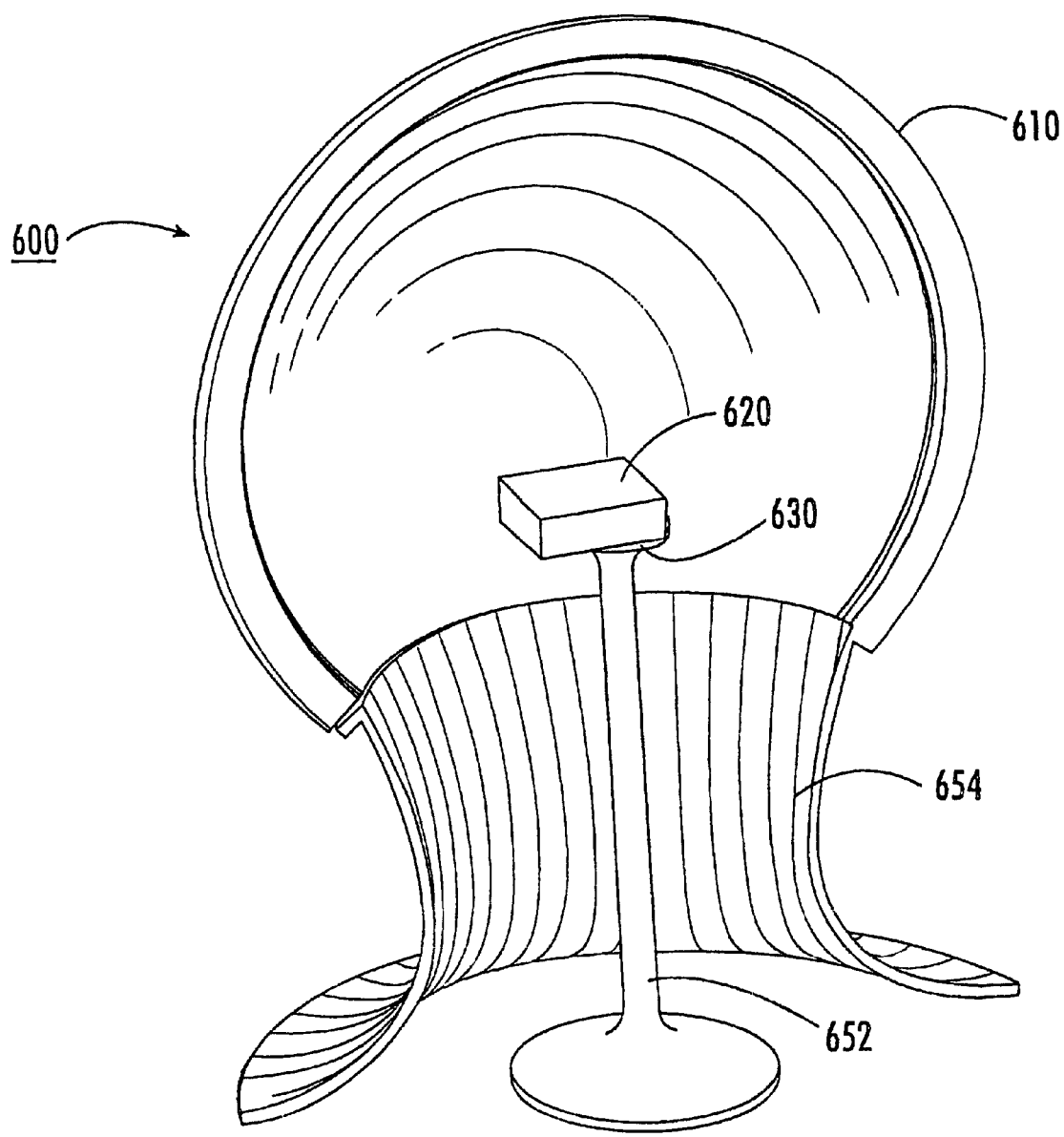
FIG. 20 is a front, perspective view of an optical projection system according to a further alternative embodiment of the present invention.

With reference to FIG. 20, an optical presentation system 600 according to a further embodiment of the present invention is shown therein. The system 600 includes a separate pedestal 652 which is separate from the pedestal 654 which supports the dome 610. A projector 620 is supported on a support platform 630 at the top of the pedestal 652.

Figure 21:
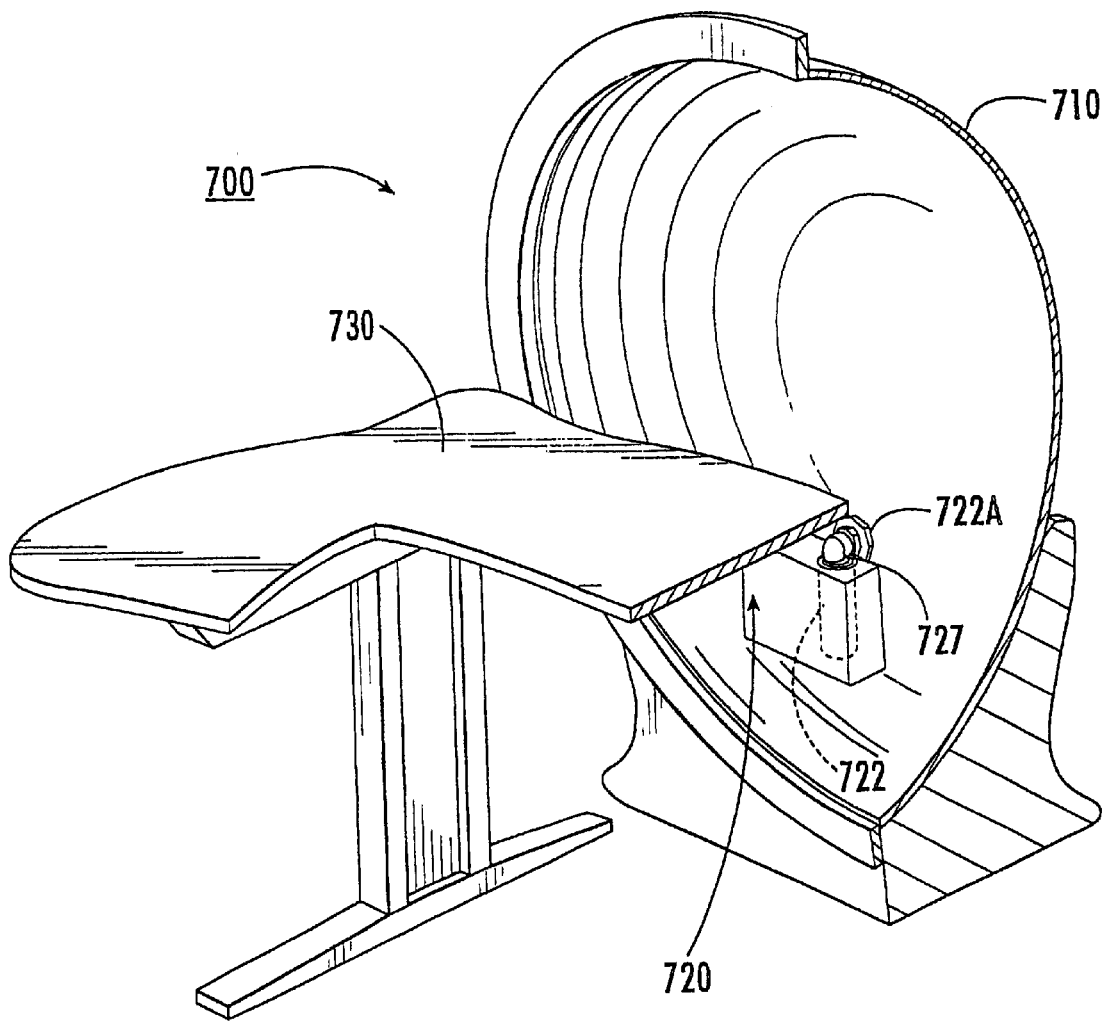
FIG. 21 is a fragmentary, front, perspective view of an optical projection system according to a further alternative embodiment of the present invention.

With reference to FIG. 21, an optical projection system 700 according to a further embodiment is shown therein. The system 700 corresponds to the workstation 100 except as follows. The projector 720 depends from the desktop 730 and is vertically disposed (i.e., rotated 90° about a transverse, horizontal axis as compared to the projector 120) such that the lens assembly 722 is vertically oriented. An elbow-shaped mirror element 727 is interposed between the horizontally oriented terminal lens 722A and the remainder of the lens assembly 722. The arrangement of the system 700 may allow for greater legroom beneath the desktop 730.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A visual workstation for use by a viewer, said workstation comprising:
    a) a dome having an open front end and a truncated spherical inner dome surface;
    b) an exposed work surface adapted for use by the viewer, said work surface being disposed in front of and adjacent said dome front end, said work surface defining a viewer area on a side of said work surface opposite said dome, said viewer area sized and configured to receive the viewer and positioned relative to said spherical inner dome surface such that the viewer, when located in said viewer area, may view said spherical inner dome surface; and
    c) a projector disposed between said viewer area and said dome, said projector operative to project a truncated spherical projection onto said inner dome surface.

2. The workstation of claim 1 wherein said spherical inner dome surface has a maximum diameter of two meters.

3. The workstation of claim 1 wherein said dome has a horizontal center axis and said work surface is horizontally disposed.

4. The workstation of claim 1 wherein said work surface and said viewer area are configured for use by a seated viewer.

5. The workstation of claim 4 including a seat disposed in said viewer area.

6. The workstation of claim 1 wherein said work surface and said viewer area are configured for use by a standing viewer.

7. The workstation of claim 1 wherein said workstation is configured to maintain a prescribed distance between said inner dome surface and work surface.

8. The workstation of claim 1 wherein said work surface is attached to said dome.

9. The workstation of claim 8 wherein said work surface is directly attached to said dome.

10. The workstation of claim 9 wherein said dome is suspended from said work surface.

11. The workstation of claim 8 including a supporting framework supporting each of said work surface and said dome, wherein said supporting framework connects said work surface and said dome to one another.

12. The workstation of claim 1 including at least one of a keyboard, a telephone, a speaker and a computer input device.

13. The workstation of claim 1 wherein said spherical inner dome surface is gray.

14. The workstation of claim 1 wherein:
    said dome has a vertical midpoint;
    said projector includes a terminal lens;
    said terminal lens is located below said vertical midpoint; and
    the workstation is adapted to position the viewer's head above said vertical midpoint when the viewer is seated in said viewer area.

15. The workstation of claim 1 wherein:
    said spherical inner dome surface defines a front plane;
    said projector includes a terminal lens; and
    said terminal lens is disposed within said front plane and/or within said dome.

16. The workstation of claim 1 wherein said truncated spherical projection extends across at least 180 degrees.

17. The workstation of claim 1 wherein said spherical inner dome surface has vertical and horizontal sweeps of in the range of between about 140 and 180 degrees.

18. The workstation of claim 1 wherein said truncated spherical projection includes an axially asymmetric, truncated spherical image.

19. The workstation of claim 18 including an image source having a center and wherein:
    said projector includes a lens assembly having an optical axis; and
    said optical axis is spaced apart from said center of said image source.

20. The workstation of claim 19 wherein said image source comprises an array of image pixels and said projector is operative to project said array of image pixels onto said inner dome surface as a truncated spherical projection having constant angular separation among adjacent image pixels.

21. The workstation of claim 1 including:
    an image source comprising an array of image pixels, wherein said projector is operative to project said array of image pixels onto said inner dome surface as a truncated spherical projection; and
    the number of pixels of said array of image pixels which are projected by said projector onto said inner dome surface is adjustable.

22. The workstation of claim 1 wherein said projector includes a vertically oriented lens assembly, a horizontally oriented terminal lens and a mirror element between the lens assembly and the terminal lens.

23. The workstation of claim 1 wherein the projector is disposed below said work surface.

24. A visual presentation system for use by a viewer, said system comprising:
    a) a dome having an open front end and a truncated spherical inner dome surface;
    b) a support surface disposed in front of said dome front end; and
    c) a projector supported by said support surface, said projector operative to project a truncated spherical projection onto said inner dome surface;
    d) a pedestal supporting said dome;
    e) wherein said system is configured to maintain a prescribed distance between said inner dome surface and said support surface.

25. The system of claim 24 including a support arm extending between said dome and said support surface, wherein said support arm maintains said prescribed distance between said inner dome surface and said support surface.

26. The system of claim 24 wherein said system is configured for use by a standing viewer.

27. The system of claim 24 wherein said dome has a horizontal center axis.

28. A visual presentation system for use by a viewer, said system comprising:
   a) a dome having an open front end and a truncated spherical inner dome surface; and
   b) a projector operative to project a truncated spherical projection onto said inner dome surface;
   c) wherein said truncated spherical inner dome surface has a maximum diameter of two meters.

29. The system of claim 28 wherein said dome has a horizontal center axis.

30. The system of claim 28 including a supporting framework supporting said dome.

31. The system of claim 28 wherein said spherical inner dome surface is gray.

32. The system of claim 28 defining a prescribed viewer area and wherein:
   said dome has a vertical midpoint;
   said projector includes a terminal lens;
   said terminal lens is located below said vertical midpoint; and
   the workstation is adapted to position the viewer's head above said vertical midpoint when the viewer is seated in said viewer area.

33. The system of claim 28 wherein:
   said spherical inner dome surface defines a front plane;
   said projector includes a terminal lens; and
   said terminal lens is disposed within said front plane and/or within said dome.

34. The system of claim 28 wherein said truncated spherical projection extends across at least 180 degrees.

35. The system of claim 28 wherein said spherical inner dome surface has vertical and horizontal sweeps of between about 140 and 180 degrees.

36. The system of claim 28 wherein said truncated spherical projection includes an axially asymmetric, truncated spherical image.

37. The system of claim 36 including an image source having a center and wherein:
   said projector includes a lens assembly having an optical axis; and
   said optical axis is spaced apart from said center of said image source.

38. The system of claim 37 wherein said image source comprises an array of image pixels and said projector is operative to project said array of image pixels onto said inner dome surface as a truncated spherical projection having constant angular separation among adjacent image pixels.

39. The workstation of claim 28 including an image source comprising an array of image pixels, and wherein:
   said projector is operative to project said array of image pixels onto said inner dome surface as a truncated spherical projection; and
   the number of pixels of said array of image pixels which are projected by said projector onto said inner dome surface is adjustable.

40. The workstation of claim 28 wherein said projector includes a vertically oriented lens assembly, a horizontally oriented terminal lens and a mirror element between the lens assembly and the terminal lens.

41. A visual presentation system for use by a viewer, said system comprising:
   a) a dome having an open front end and a truncated spherical inner dome surface;
   b) an image source comprising an array of image pixels;
   c) a projector operative to project said array of image pixels onto said inner dome surface as a truncated spherical projection; and
   d) wherein the number of pixels of said array of image pixels which are projected by said projector onto said inner dome surface is adjustable.

42. The system of claim 41 wherein said truncated spherical projection has constant angular separation among adjacent pixels.

43. The system of claim 41 wherein:
   said array of image pixels defines an array center;
   said projector includes a lens assembly having an optical axis; and
   the position of said optical axis relative to said array center is adjustable.

44. The system of claim 41 wherein said truncated spherical projection includes an axially asymmetric, truncated spherical primary image.

45. A visual presentation system for use by a viewer, said system comprising:
   a) a dome having an open front end and a truncated spherical inner dome surface;
   b) an image source displaying a source image, said source image including a primary image and a secondary image adjacent said primary image;
   c) a projector selectively operable to project said source image onto said inner dome surface as a truncated spherical projection such that both said primary and said secondary image are projected onto said inner dome surface and, alternatively, such that only said primary image is projected onto said inner dome surface.

46. The system of claim 45 wherein said projector is selectively operable to project an entirety of said source image onto said inner dome surface.

47. The system of claim 45 wherein:
   said source image has a center;
   said projector includes a lens assembly having an optical axis; and
   the position of said optical axis relative to said center is adjustable.

48. The system of claim 45 wherein said primary image is truncated circularly shaped.

49. The system of claim 48 wherein said source image is rectangular.

50. A method of displaying an image on a dome having an open front end and a truncated spherical inner dome surface, said method comprising the steps of:
   providing a source image including a primary image and a secondary image adjacent said primary image;
   projecting the source image such that only the primary image is projected onto the inner dome surface as a truncated spherical projection;
   thereafter, projecting the source image such that both the primary image and the secondary image are projected onto the inner dome surface as a truncated spherical projection.

51. The method of claim 50 wherein each of the steps of projecting includes projecting the source image using a lens assembly having an optical axis, said method further including the step of adjusting the relative positions of the optical axis and a center of the source image.

52. The method of claim 51 wherein said primary image is truncated circularly shaped and said step of projecting the source image such that only the primary image is projected includes spacing the optical axis and the center of the source image apart.

53. A visual workstation for use by a viewer, said workstation comprising:
   a) a dome having an open front end and a truncated spherical inner dome surface; and
   b) an exposed work surface adapted for use by the viewer, said work surface being disposed in front of and adjacent said dome front end, said work surface defining a viewer area on a side of said work surface opposite said dome, said viewer area sized and configured to receive the viewer and positioned relative to said spherical inner dome surface such that the viewer, when located in said viewer area, may view said spherical inner dome surface.

54. A method of displaying an image, said method comprising the steps of:
   providing an upright dome having an open front end and a truncated spherical inner dome surface, the inner dome surface defining a horizontal center axis and having a maximum diameter of two meters; and
   projecting the image as a truncated spherical projection onto the inner dome surface.

* * * * *